(12) United States Patent
Takemoto et al.

(10) Patent No.: US 8,659,832 B2
(45) Date of Patent: Feb. 25, 2014

(54) ZOOM LENS AND IMAGE PICKUP APPARATUS INCLUDING THE SAME

(75) Inventors: Shoichi Takemoto, Utsunomiya (JP); Yutaka Iriyama, Utsunomiya (JP)

(73) Assignee: Canon Kabushiki Kaisha (JP)

( * ) Notice: Subject to any disclaimer, the term of this patent is extended or adjusted under 35 U.S.C. 154(b) by 283 days.

(21) Appl. No.: 13/106,327

(22) Filed: May 12, 2011

(65) Prior Publication Data

US 2011/0279898 A1  Nov. 17, 2011

(30) Foreign Application Priority Data

May 14, 2010  (JP) ................. 2010-111932

(51) Int. Cl.
*G02B 27/64* (2006.01)
*G02B 15/14* (2006.01)
*G02B 9/34* (2006.01)

(52) U.S. Cl.
CPC ............. *G02B 27/64* (2013.01); *G02B 15/14* (2013.01); *G02B 9/34* (2013.01); *G02B 27/646* (2013.01)
USPC ............ 359/557; 359/554; 359/676; 359/687

(58) Field of Classification Search
USPC .......................... 359/554, 557, 676, 686–687
See application file for complete search history.

(56) References Cited

U.S. PATENT DOCUMENTS

| | | | | |
|---|---|---|---|---|
| 5,654,826 A | * | 8/1997 | Suzuki | 359/557 |
| 5,731,897 A | * | 3/1998 | Suzuki | 359/557 |
| 5,828,499 A | * | 10/1998 | Ohtake | 359/676 |
| 6,560,016 B2 | | 5/2003 | Usui et al. | |
| 6,693,750 B2 | * | 2/2004 | Sato | 359/687 |
| 7,558,004 B2 | * | 7/2009 | Ori | 359/686 |
| 8,228,605 B2 | * | 7/2012 | Arakawa et al. | 359/557 |
| 2005/0157403 A1 | | 7/2005 | Sato | |
| 2007/0236806 A1 | | 10/2007 | Ori | |
| 2009/0086321 A1 | | 4/2009 | Mizuguchi et al. | |

FOREIGN PATENT DOCUMENTS

JP  2001-100089 A  4/2001
JP  2001-281546 A  10/2001

OTHER PUBLICATIONS

Yoshiya Matsui; "Third-order Aberration Theory for Decentered Optical System" Japan Optomechatronics Association; First Edition, First Print Jun. 1990. (English language translation provided), pp. 1-7.
Extended European Search Report issued Oct. 5, 2011 for corresponding European Patent Application No. 11165816.7.

* cited by examiner

*Primary Examiner* — Thong Nguyen
(74) *Attorney, Agent, or Firm* — Rossi, Kimms & McDowell LLP

(57) ABSTRACT

A zoom lens includes a first lens unit, a magnification-varying system including at least a second lens unit and a third lens unit, and a fourth lens unit. The fourth lens first unit has a first lens subunit having a negative refractive power, a second lens subunit having a negative refractive power, and a third lens subunit having a positive refractive power. The fourth lens unit satisfies the following conditional expression: $1.2 < f41/f42 < 3.5$, where $f41$ represents a focal length of the first lens subunit, and $f42$ represents a focal length of the second lens subunit.

10 Claims, 22 Drawing Sheets

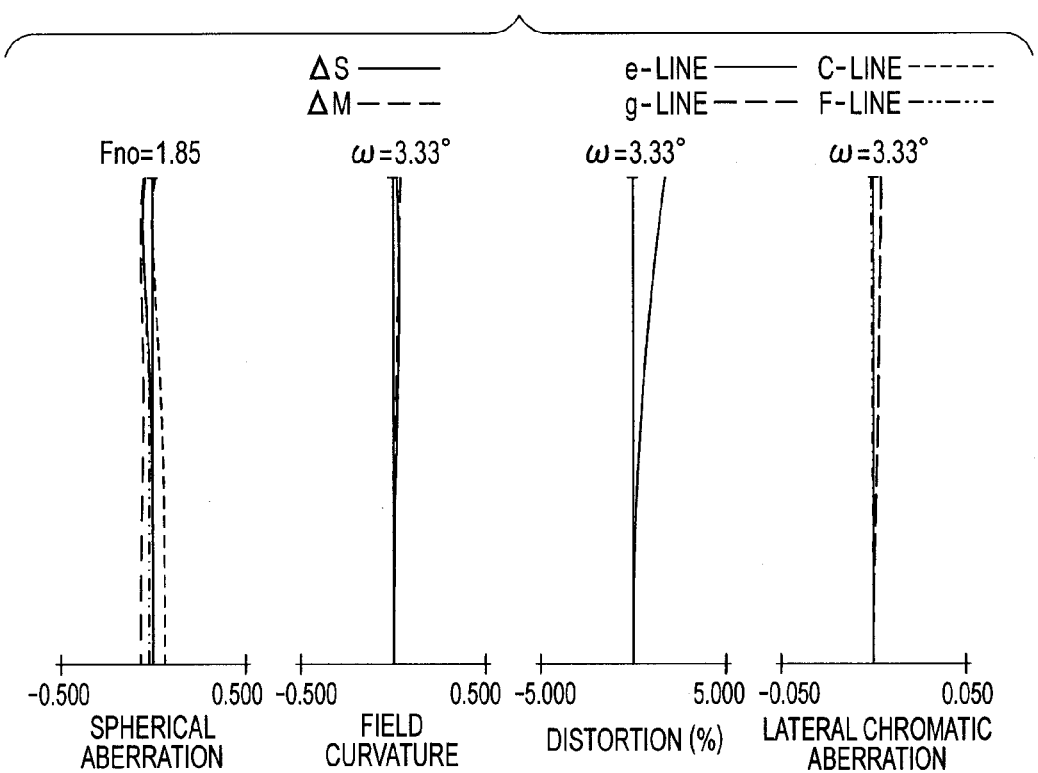
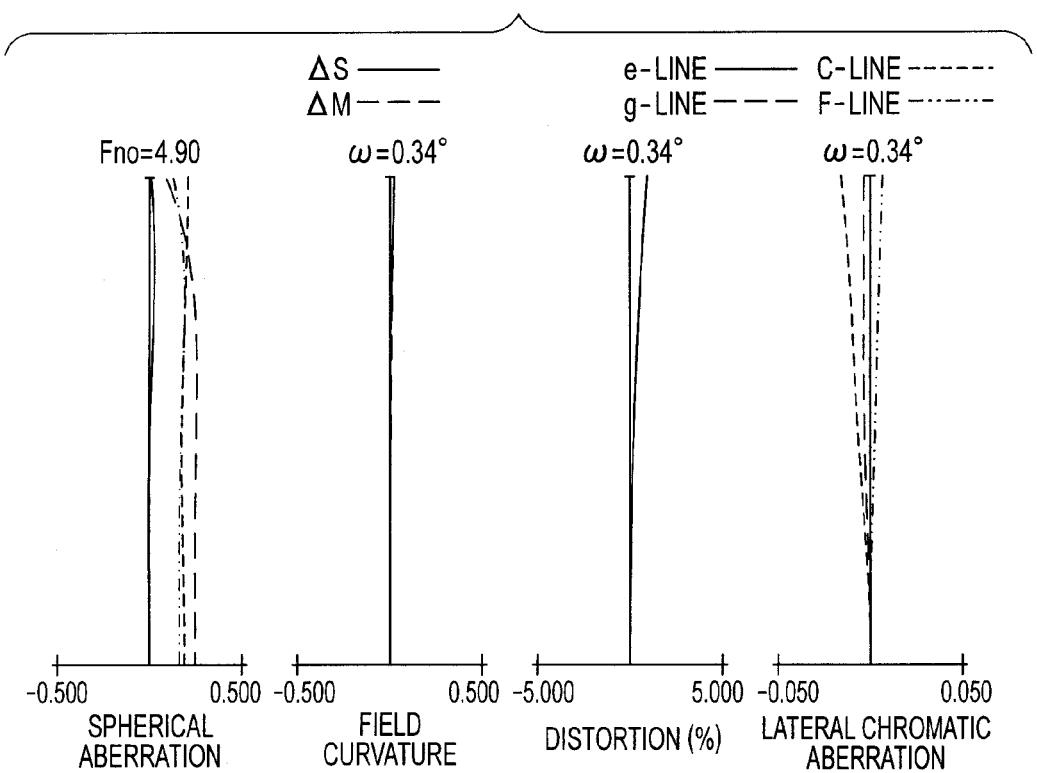

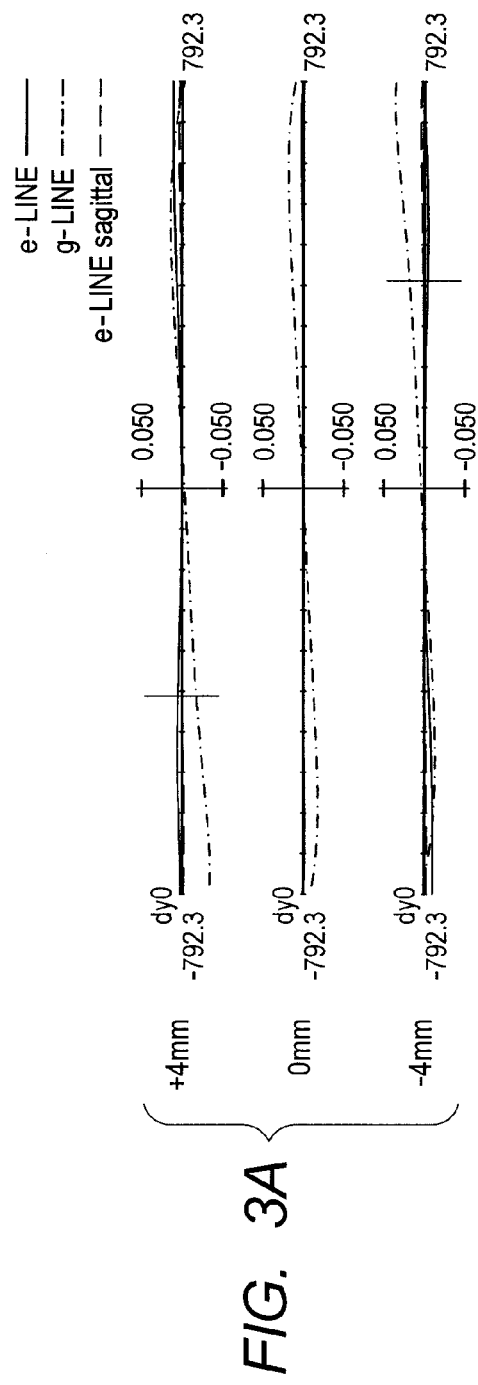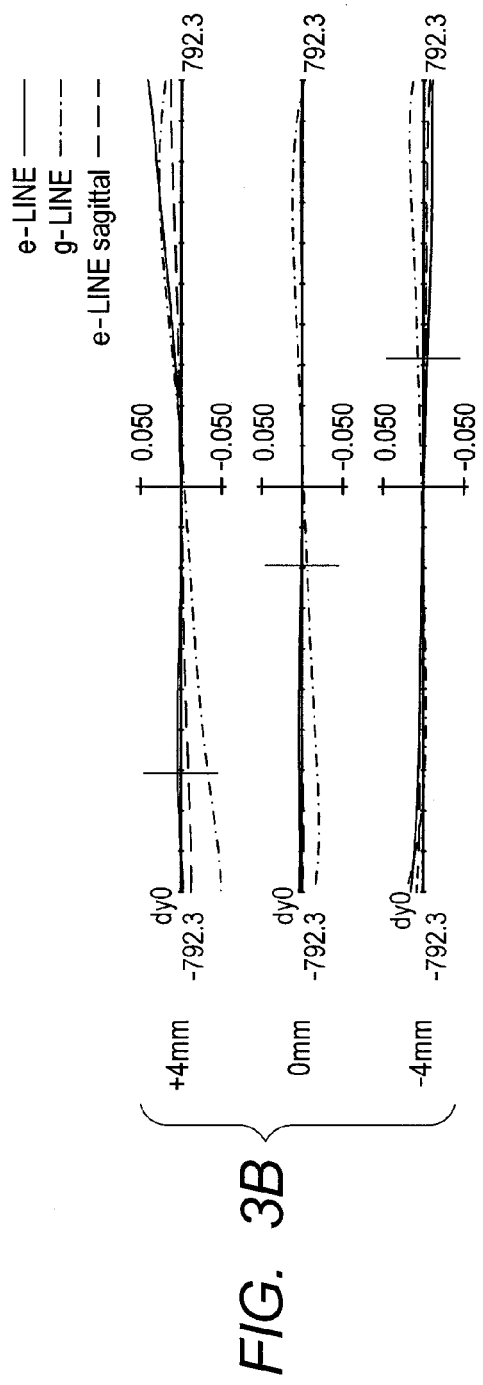

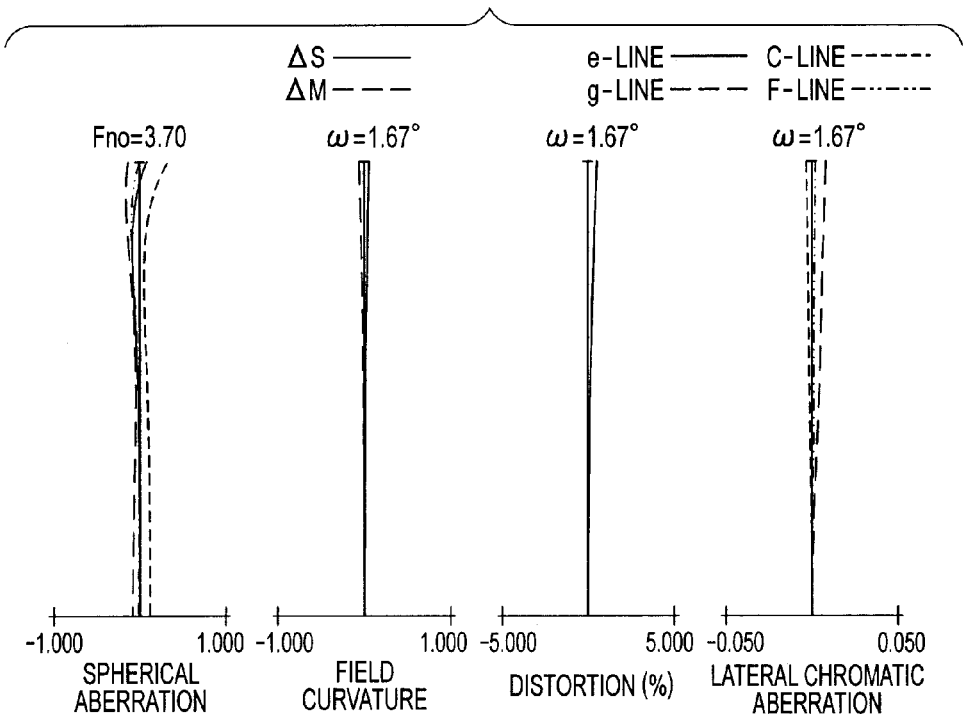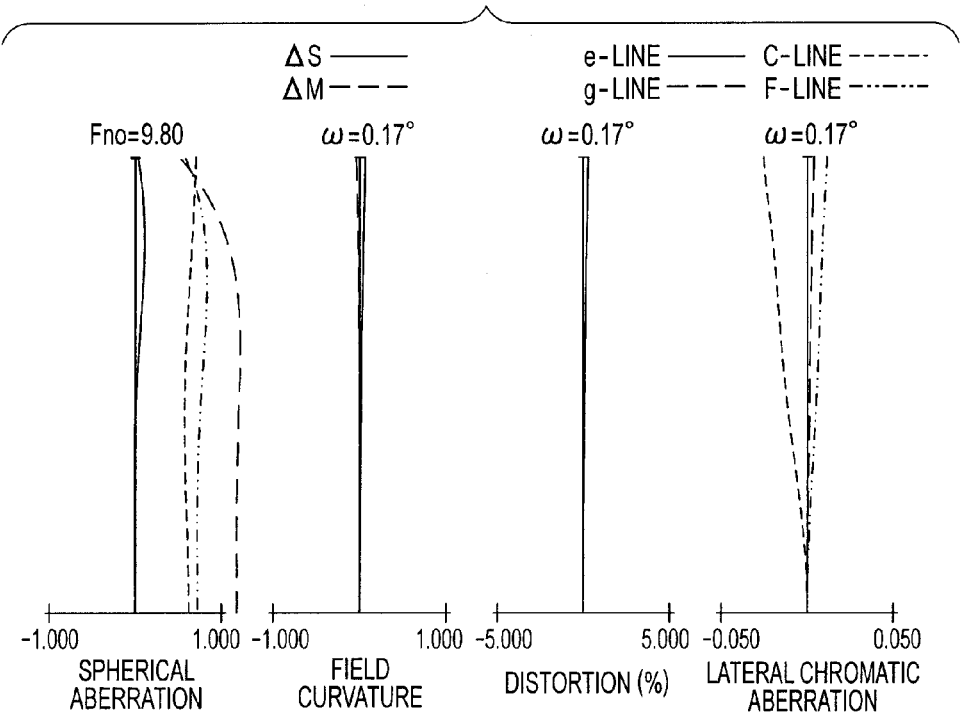

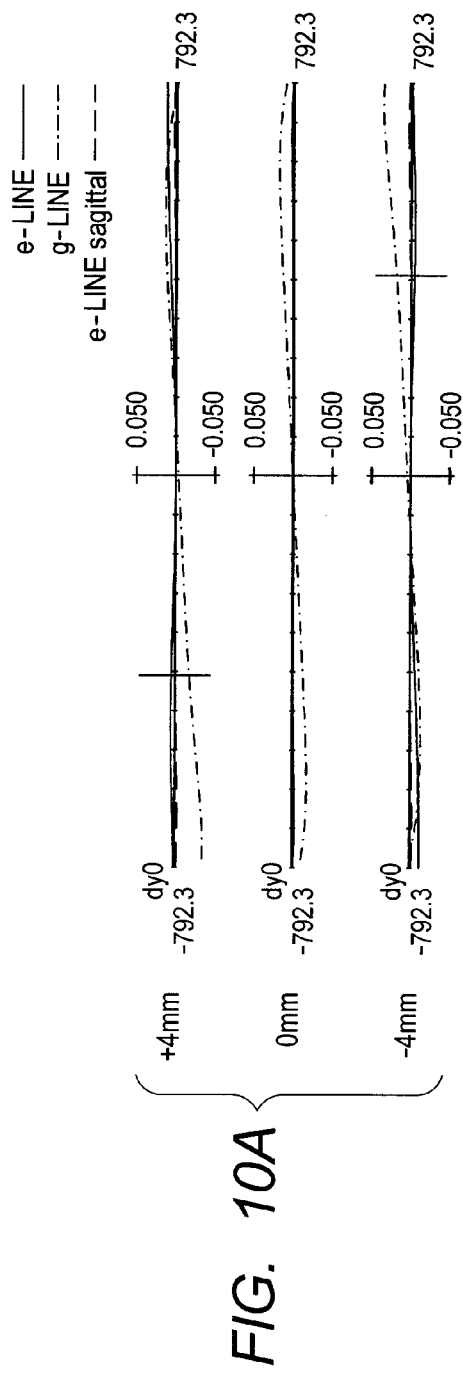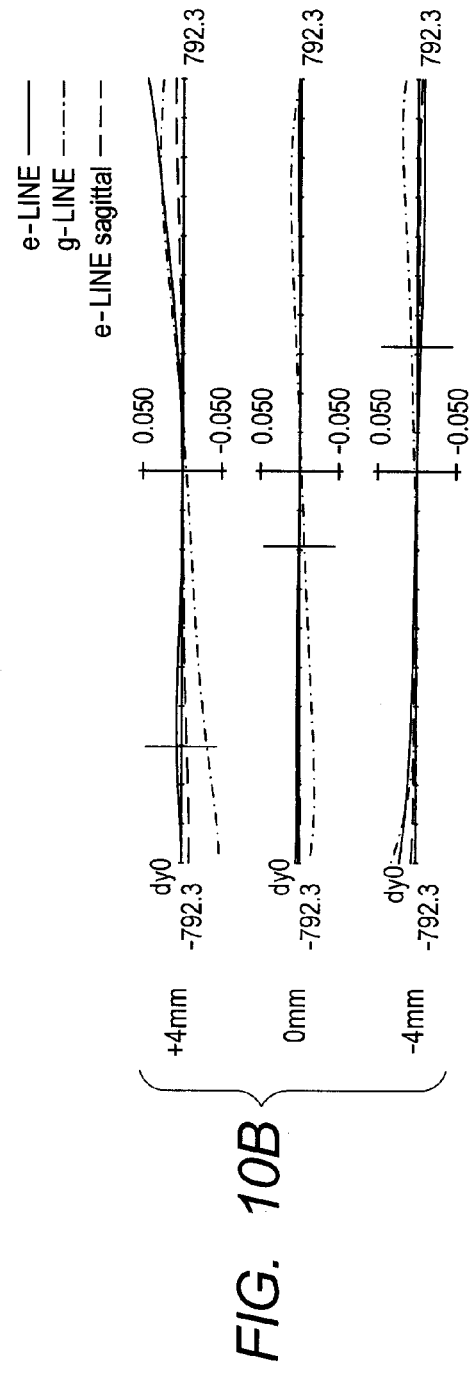

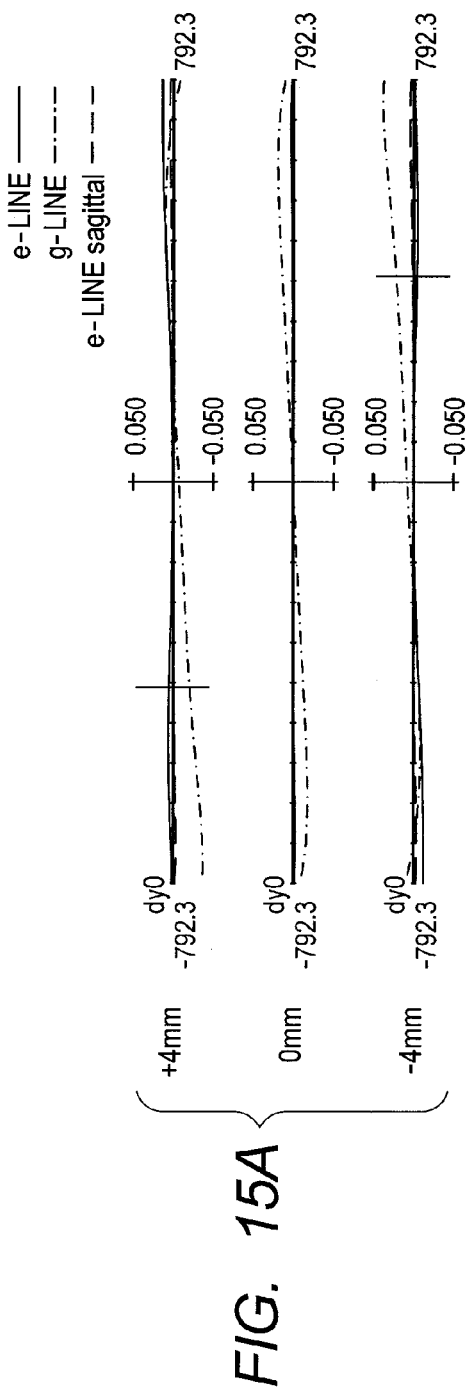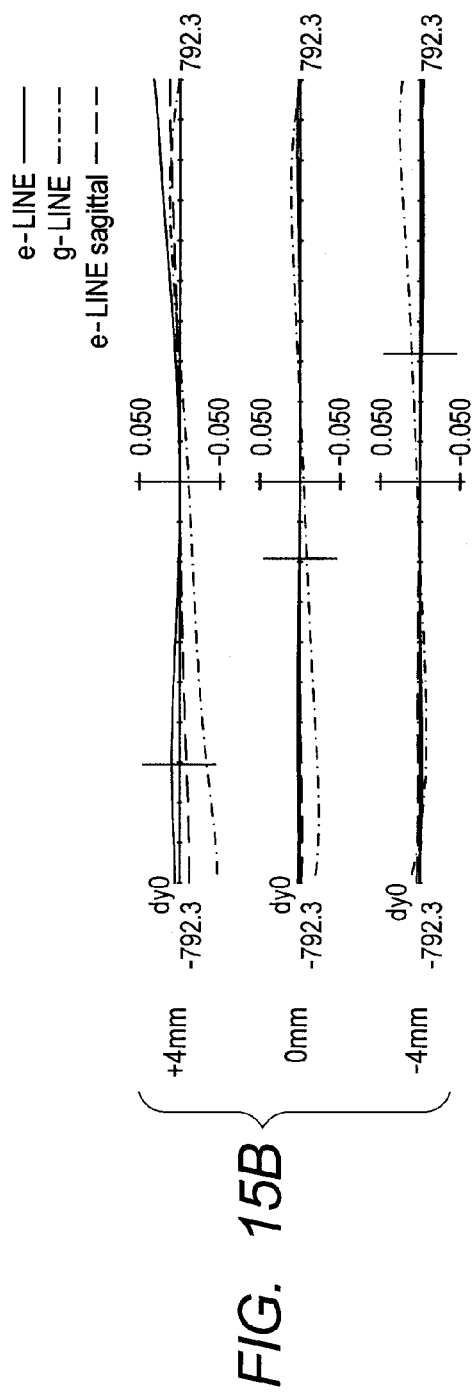
FIG. 15A
FIG. 15B

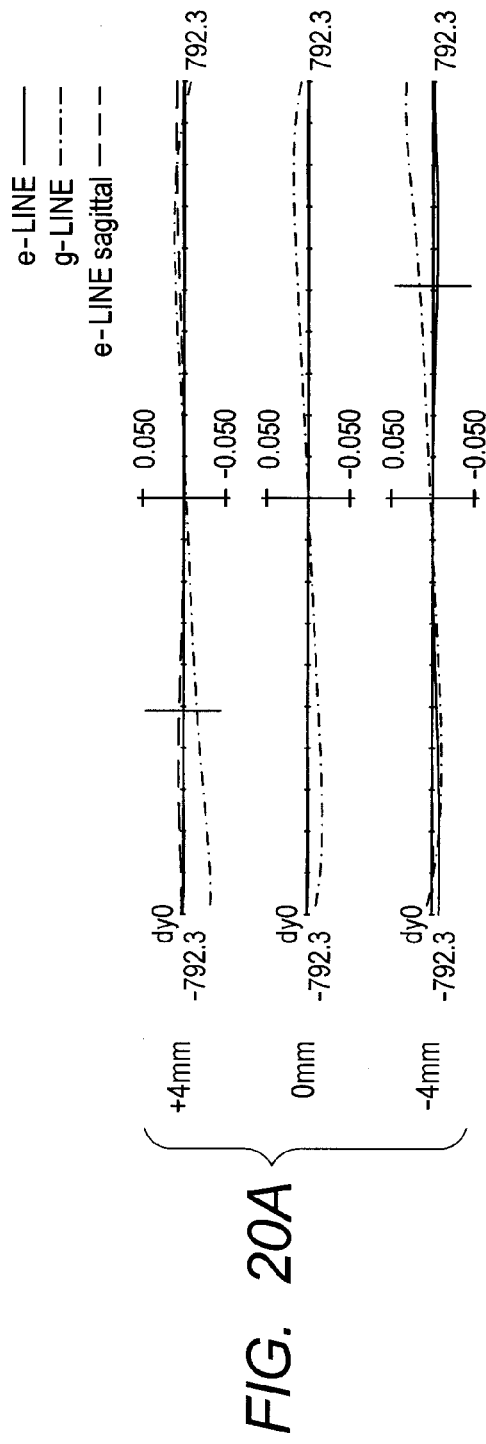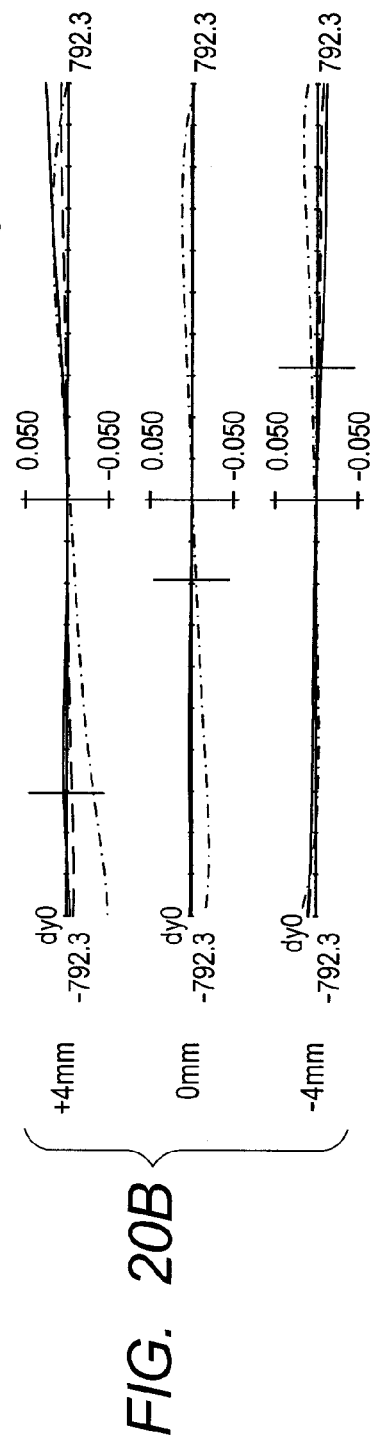

ZOOM LENS AND IMAGE PICKUP APPARATUS INCLUDING THE SAME

BACKGROUND OF THE INVENTION

1. Field of the Invention

The present invention relates to a zoom lens having an image stabilizing function for optically correcting blur of a taken image due to shake or vibration, which is suitable for an image pickup apparatus such as a TV camera, a digital camera or a video camera.

2. Description of the Related Art

Conventionally, an image pickup optical system which is used for a TV camera, a video camera or the like is required to be a zoom lens having a large diameter, a high zoom ratio and high optical performance.

In addition to this, operability and mobility are important for a broadcast TV camera in particular. In order to respond to the requirements, a ⅔ inch or ½ inch small solid-state image pickup element (CCD) is used as an image pickup device in many cases. This CCD has substantially uniform resolving power over the entire image pickup range. Therefore, the zoom lens using the CCD is required to have substantially uniform resolving power from the center to periphery of a screen. For example, it is required that various aberrations such as coma, astigmatism and distortion are corrected appropriately so that the entire screen has high optical performance. Further, the zoom lens is required to have a large diameter, a wide angle of field, and a high zoom ratio with small size and light weight. In addition, the zoom lens is required to have a long back focus because a color separation optical system and various filters are disposed on the object side of the image pickup unit. Other than that, in a zoom lens having a high zoom ratio with the zoom range of long focal length, it is important to reduce image blur due to vibration or shake. Therefore, the zoom lens is demanded to have the image stabilizing function for reducing blur of an image.

As a zoom lens having the image stabilizing function, there is known a zoom lens which corrects blur of a taken image by decentering a sub lens unit constituting the zoom lens in the direction perpendicular to the optical axis (U.S. Pat. No. 6,560,016, and Japanese Patent Application Laid-Open No. 2001-100089).

The zoom lens having the image stabilizing function has an advantage in that a special optical system for image stabilizing is not required. However, more space is necessary for moving the lens unit, and large decentering aberration is generated in the image stabilizing. Therefore, an optical arrangement of the image stabilizing lens unit and the lens unit disposed on the image side of the image stabilizing lens unit is devised so as to correct the decentering aberration generated in the image stabilizing.

In U.S. Pat. No. 6,560,016 and Japanese Patent Application Laid-Open No. 2001-100089, the zoom lens is constituted by a first lens unit that is not moved for zooming, a second lens unit as a magnification-varying unit, a third lens unit for correcting image plane variation due to magnification-varying and a fourth lens unit that is not moved for zooming. Further, there is disclosed a zoom lens including an image stabilizing lens unit disposed at the most object side in the fourth lens unit. In addition, in U.S. Pat. No. 6,560,016 and Japanese Patent Application Laid-Open No. 2001-100089, a movement amount in the direction perpendicular to the optical axis when the image stabilizing lens unit is decentered is increased, to thereby enhance the effect of correcting blur of the image. Thus, the drive mechanism is downsized, and deterioration of image quality due to the decentering is reduced. Matsui (the $23^{rd}$ meeting proceeding of the Japan Society of Applied Physics, 1962) discloses a method of aberration correction from a standpoint of aberration theory on generation of decentering aberration when a sub system in the optical system is decentered in the direction perpendicular to the optical axis.

In the optical system in which the image stabilizing is performed by decentering the image stabilizing lens unit in the direction perpendicular to the optical axis, the image stabilizing lens unit is shifted also in the optical axis direction not a little. As a result, there is a problem that a focus variation occurs. In particular, in a broadcast zoom lens, using a built-in extender or the like, a magnification-varying range (zooming range) is shifted to the telephoto side or to the wide-angle side by inserting or removing the unit into or from the optical axis. In this case, focus variation caused by image stabilizing drive may be increased or decreased by the unit switching, which becomes a large practical problem.

In addition, in order to improve trackability of the correction to blur of the image and to reduce a load on the drive system, it is required that the image stabilizing lens unit is compact and lightweight. However, if particularly high optical performance is demanded also in decentering as in the case of the broadcast zoom lens having a high zoom ratio, it is so difficult to achieve a compact and lightweight image stabilizing lens unit while maintaining good optical performance in image stabilizing.

It is important for the zoom lens having the image stabilizing function and high zoom ratio to reduce the focus variation due to the image stabilizing drive and to appropriately correct aberrations due to decentering, in particular, decentering coma and decentering lateral chromatic aberration.

SUMMARY OF THE INVENTION

A zoom lens according to the present invention includes in order from an object side to an image side: a first lens unit having a positive refractive power that does not move for zooming; a magnification-varying system including at least a second lens unit having a negative refractive power for magnification and a third lens unit having a positive refractive power for correcting image plane variation due to magnification-varying; and a fourth lens unit having a positive refractive power that does not move for zooming. The fourth lens unit includes: a first lens subunit having a negative refractive power; a second lens subunit having a negative refractive power that moves in a direction having a component perpendicular to an optical axis so as to displace an image in a direction perpendicular to the optical axis; and a third lens subunit having a positive refractive power The fourth lens unit satisfies the following conditional expression:

$$1.2 < f41/f42 < 3.5,$$

where f41 represents a focal length of the first lens subunit, and f42 represents a focal length of the second lens subunit.

Further features of the present invention will become apparent from the following description of exemplary embodiments with reference to the attached drawings.

BRIEF DESCRIPTION OF THE DRAWINGS

FIG. 2B is a longitudinal aberration diagram at a focal length of 94.44 mm according to Numerical Embodiment 1 of the present invention.

FIG. 2C is a longitudinal aberration diagram at a telephoto end according to Numerical Embodiment 1 of the present invention.

FIG. 3A is a lateral aberration diagram at the telephoto end according to Numerical Embodiment 1 of the present invention.

FIG. 3B is a lateral aberration diagram when an image stabilizing unit is decentered by 1.70 mm in the direction perpendicular to the optical axis at the telephoto end according to Numerical Embodiment 1 of the present invention.

FIG. 7B is a longitudinal aberration diagram at a focal length of 188.88 mm when the extender lens IE is applied according to Numerical Embodiment 1 of the present invention.

FIG. 7C is a longitudinal aberration diagram at the telephoto end when the extender lens IE is applied according to Numerical Embodiment 1 of the present invention.

FIG. 10A is a lateral aberration diagram at the telephoto end according to Numerical Embodiment 2 of the present invention.

FIG. 10B is a lateral aberration diagram when the image stabilizing unit is decentered by 2.30 mm in the direction perpendicular to the optical axis at the telephoto end according to Numerical Embodiment 2 of the present invention.

FIG. 15A is a lateral aberration diagram at the telephoto end according to Numerical Embodiment 3 of the present invention.

FIG. 15B is a lateral aberration diagram when the image stabilizing unit is decentered by 1.25 mm in the direction perpendicular to the optical axis at the telephoto end according to Numerical Embodiment 3 of the present invention.

FIG. 20A is a lateral aberration diagram at the telephoto end according to Numerical Embodiment 4 of the present invention.

FIG. 20B is a lateral aberration diagram when the image stabilizing unit is decentered by 1.75 mm in the direction perpendicular to the optical axis at the telephoto end according to Numerical Embodiment 4 of the present invention.

DESCRIPTION OF THE EMBODIMENT

The present invention aims to provide a zoom lens capable of easily reducing the size and weight of an image stabilizing lens unit while reducing focus variation caused by the image stabilizing drive and maintaining good optical performance during image stabilizing, and to provide an image pickup apparatus including the zoom lens.

Hereinafter, an embodiment of the present invention is described in detail with reference to the attached drawings. A zoom lens of the present invention includes, in order from an object side to an image side, a first lens unit having a positive refractive power that does not move for zooming, a second lens unit having a negative refractive power for magnification-varying (zooming), and a magnification-varying system having two or more lens units including a third lens unit having a positive refractive power for correcting image plane variation due to magnification-varying. The zoom lens also includes a fourth lens unit having a positive refractive power that does not move for zooming.

The fourth lens unit includes a fixed first lens subunit R1 having a negative refractive power, a second lens subunit R2 having a negative refractive power that moves so as to have a component perpendicular to the optical axis so that the image is displaced in the direction perpendicular to the optical axis, and a fixed third lens subunit R3 having a positive refractive power where the third lens subunit includes a first lens sub-subunit R3a and a second lens sub-subunit R3b.

Figure 1:
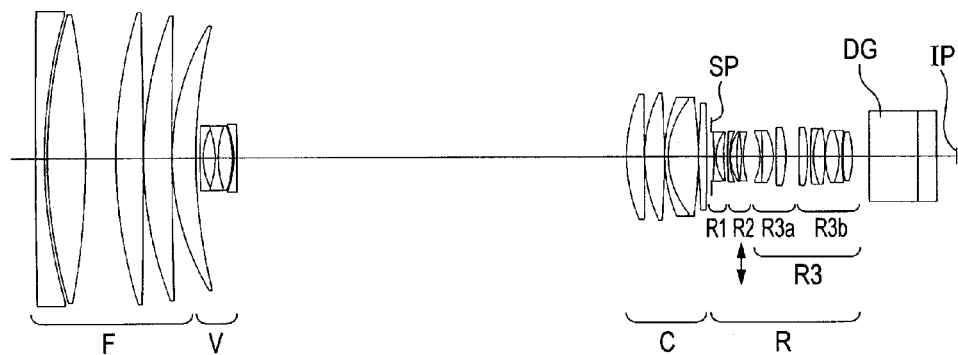
FIG. 1 is a lens cross sectional view at a wide-angle end according to Numerical Embodiment 1 of the present invention.
Figure 2A:
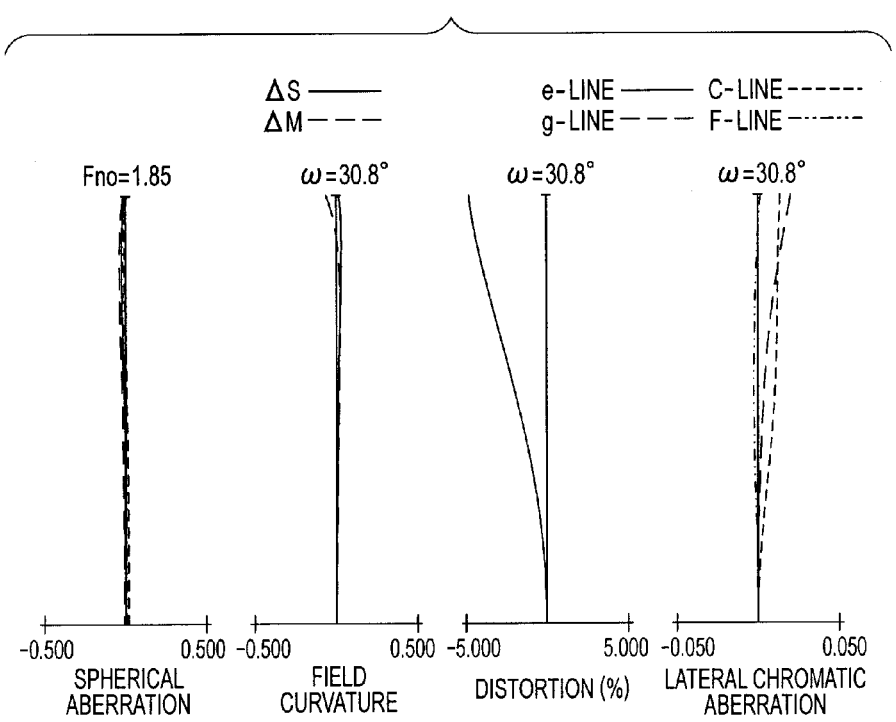
FIG. 2A is a longitudinal aberration diagram at the wide-angle end according to Numerical Embodiment 1 of the present invention.
Figure 4:
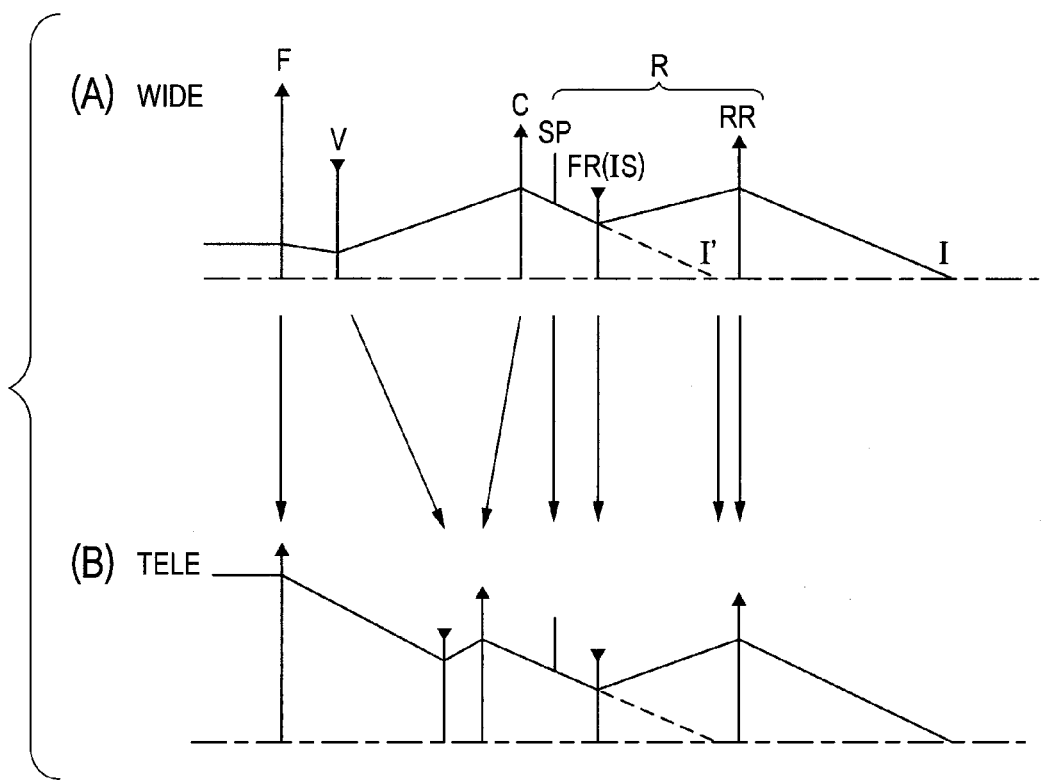
FIG. 4 is a concept of image stabilizing at the wide-angle end (A) and at the telephoto end (B), respectively, of a zoom lens of the present invention.
Figure 5:
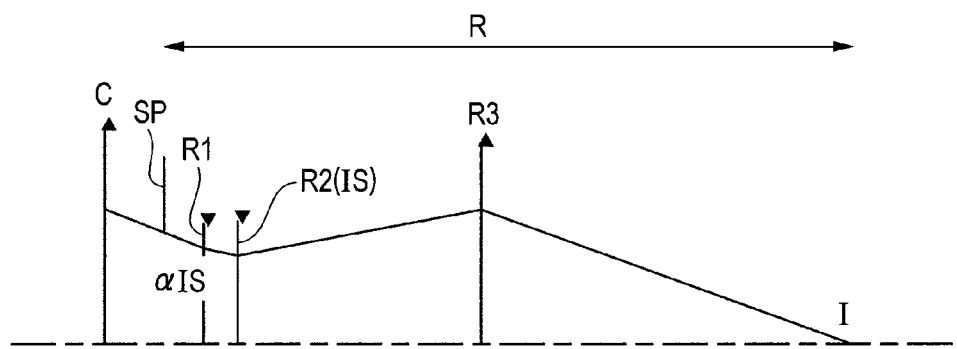
FIG. 5 is an explanatory diagram of an enlarged relay part in the conceptual diagram of the image stabilizing zoom lens of the present invention.
Figure 6:
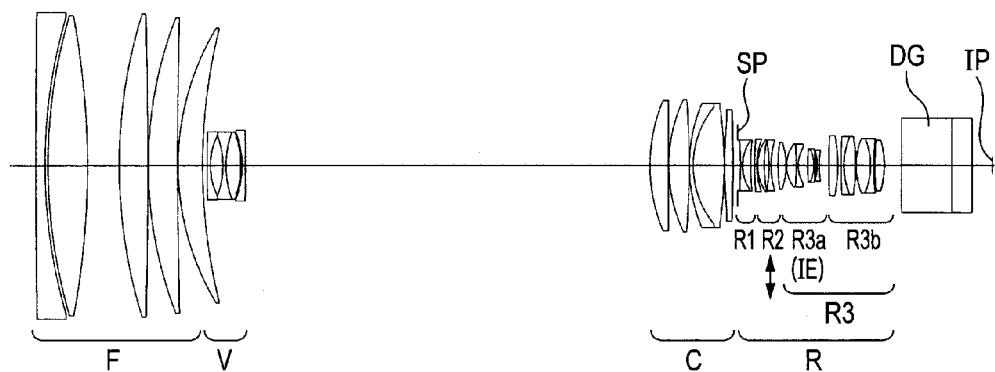
FIG. 6 is a lens cross sectional view at the wide-angle end when an extender lens IE is applied according to Numerical Embodiment 1 of the present invention.
Figure 7A:
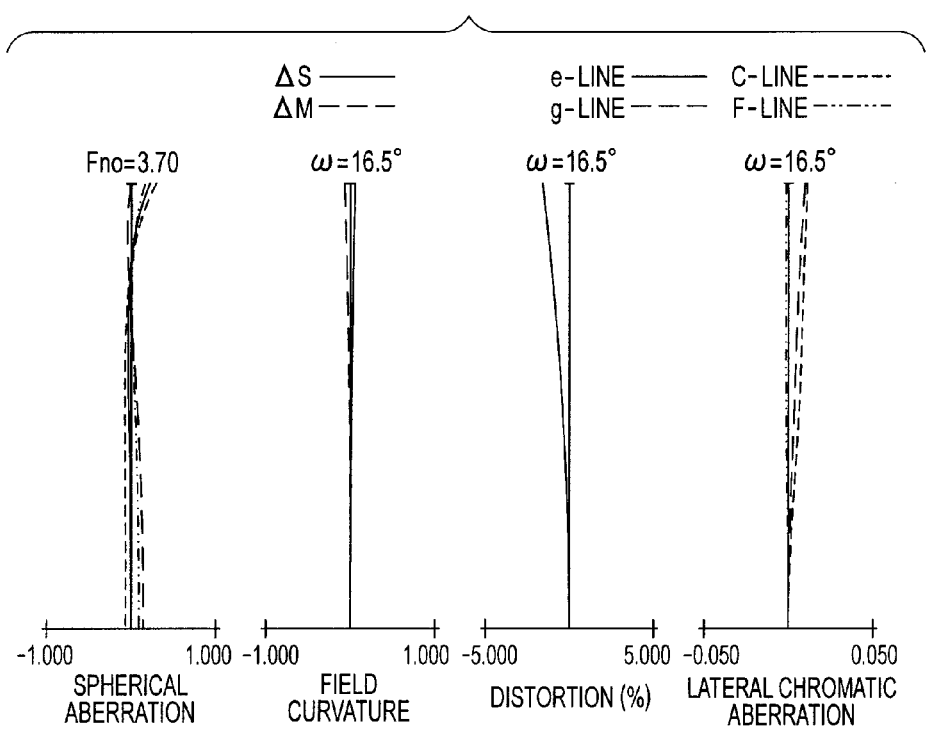
FIG. 7A is a longitudinal aberration diagram at the wide-angle end when the extender lens IE is applied according to Numerical Embodiment 1 of the present invention.

FIG. 1 is a lens cross sectional view at a wide-angle end (short focal length end) according to Numerical Embodiment 1 of the present invention. FIGS. 2A, 2B and 2C are longitudinal aberration diagrams at the wide-angle end, at a focal length of 94.44 mm and at a telephoto end, respectively, according to Numerical Embodiment 1 of the present invention. FIGS. 3A and 3B are a lateral aberration diagram at the telephoto end and a lateral aberration diagram when an image stabilizing unit is decentered by 1.70 mm in the direction perpendicular to the optical axis at the telephoto end according to Numerical Embodiment 1 of the present invention. In the lateral aberration diagrams, the numerical value at the left end indicates the height of image. The same is true in the following description. FIG. 4 is a concept of image stabilizing at the wide-angle end (A) and at the telephoto end (B), respectively, of the zoom lens of the present invention. FIG. 5 is an explanatory diagram of an enlarged relay part in the conceptual diagram of the image stabilizing zoom lens of the present invention. FIG. 6 is a lens cross sectional view at the wide-angle end when the first lens sub-subunit R3a is switched to an extender lens IE according to Numerical Embodiment 1 of the present invention. FIGS. 7A, 7B and 7C are longitudinal aberration diagrams at the wide-angle end, at a focal length of 188.88 mm, and at the telephoto end when the first lens sub-subunit R3a is switched to the extender lens IE according to Numerical Embodiment 1 of the present invention.

Figure 8:
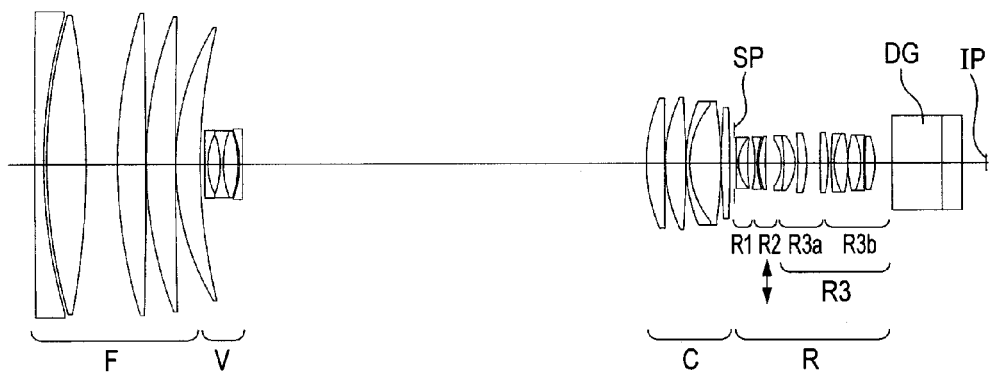
FIG. 8 is a lens cross sectional view at the wide-angle end according to Numerical Embodiment 2 of the present invention.
Figure 9A:
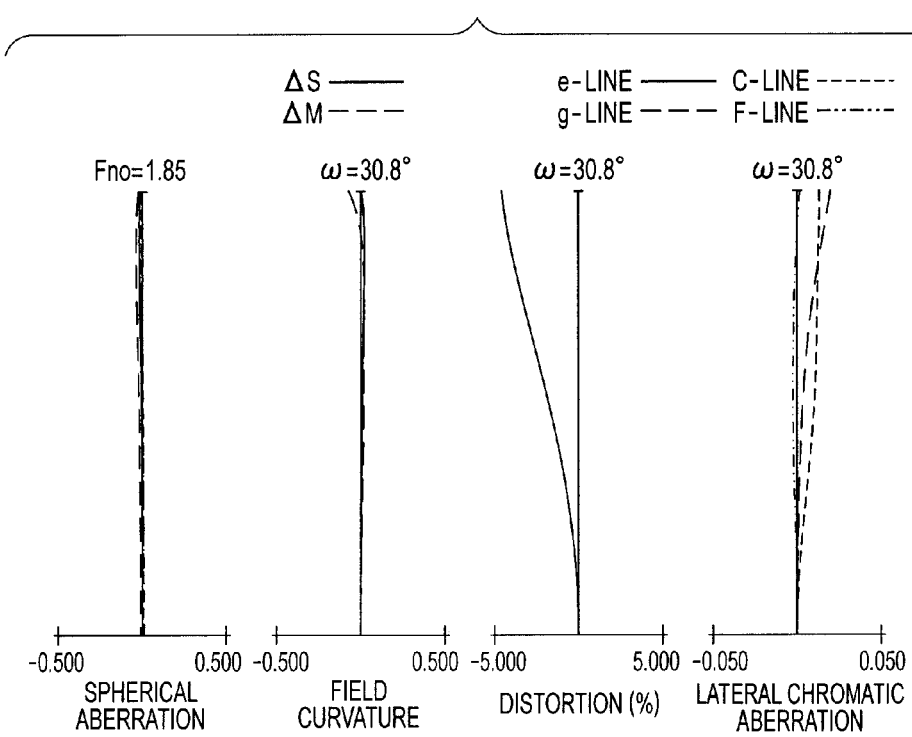
FIG. 9A is a longitudinal aberration diagram at the wide-angle end according to Numerical Embodiment 2 of the present invention.
Figure 9B:
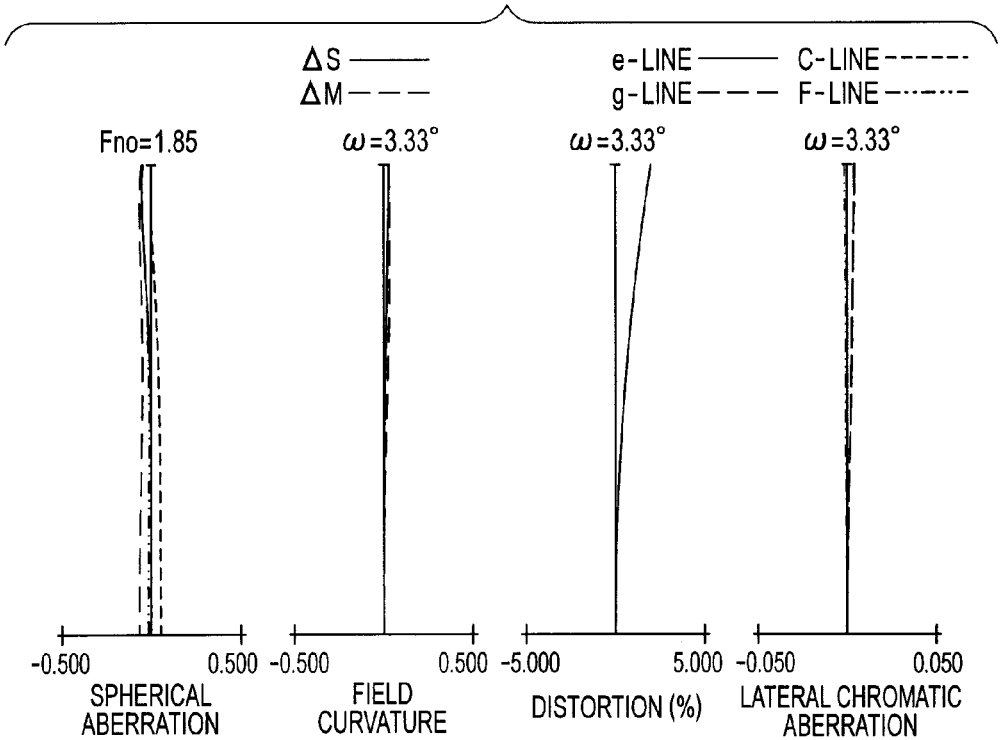
FIG. 9B is a longitudinal aberration diagram at a focal length of 94.44 mm according to Numerical Embodiment 2 of the present invention.
Figure 9C:
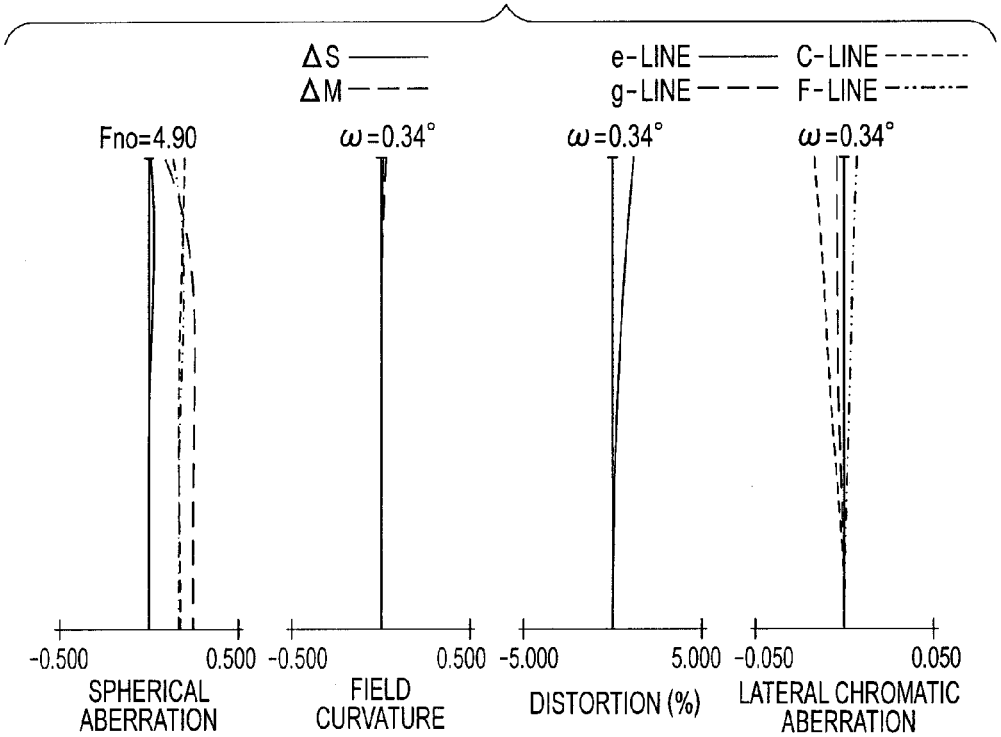
FIG. 9C is a longitudinal aberration diagram at the telephoto end according to Numerical Embodiment 2 of the present invention.

FIG. 8 is a lens cross sectional view at the wide-angle end according to Numerical Embodiment 2 of the present invention. FIGS. 9A, 9B and 9C are longitudinal aberration diagrams at the wide-angle end, at a focal length of 94.44 mm, and at the telephoto end according to Numerical Embodiment 2 of the present invention. FIGS. 10A and 10B are a lateral aberration diagram at the telephoto end and a lateral aberration diagram when the image stabilizing unit is decentered by 2.30 mm in the direction perpendicular to the optical axis at the telephoto end according to Numerical Embodiment 2 of the present invention.

Figure 11:
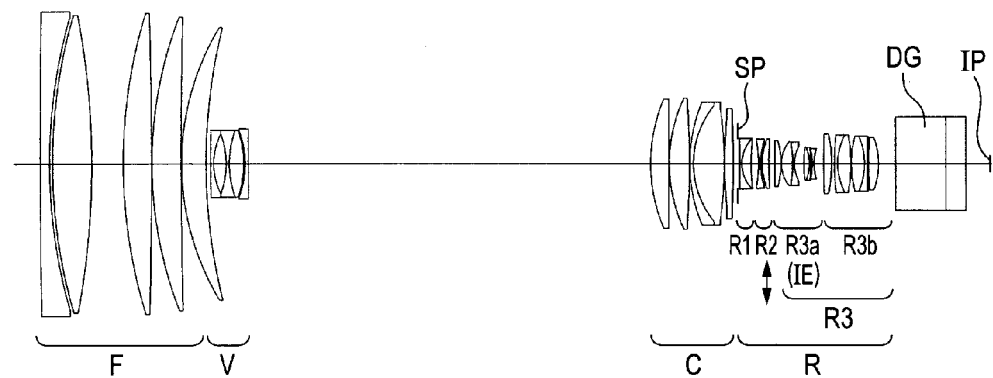
FIG. 11 is a lens cross sectional view at the wide-angle end when the extender lens IE is applied according to Numerical Embodiment 2 of the present invention.
Figure 12A:
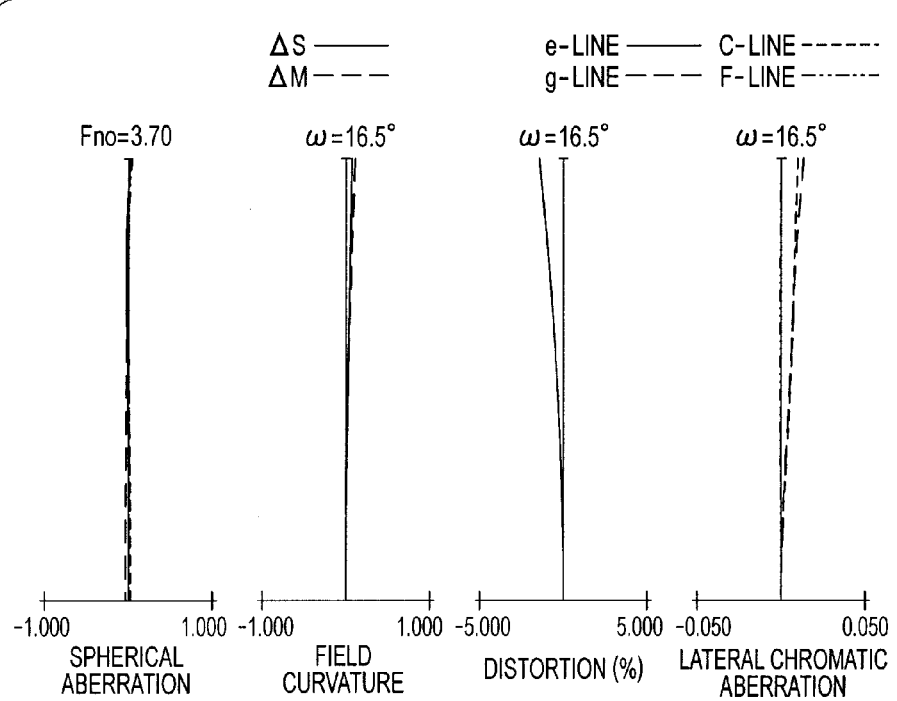
FIG. 12A is a longitudinal aberration diagram at the wide-angle end when the extender lens IE is applied according to Numerical Embodiment 2 of the present invention.
Figure 12B:
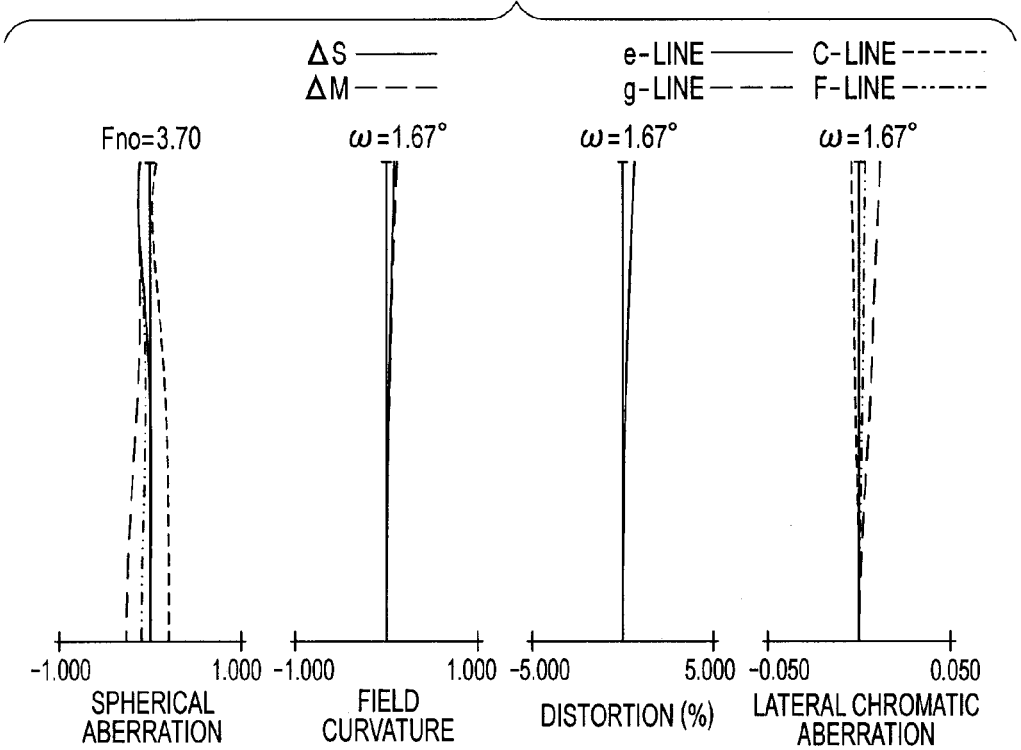
FIG. 12B is a longitudinal aberration diagram at a focal length of 188.88 mm when the extender lens IE is applied according to Numerical Embodiment 2 of the present invention.
Figure 12C:
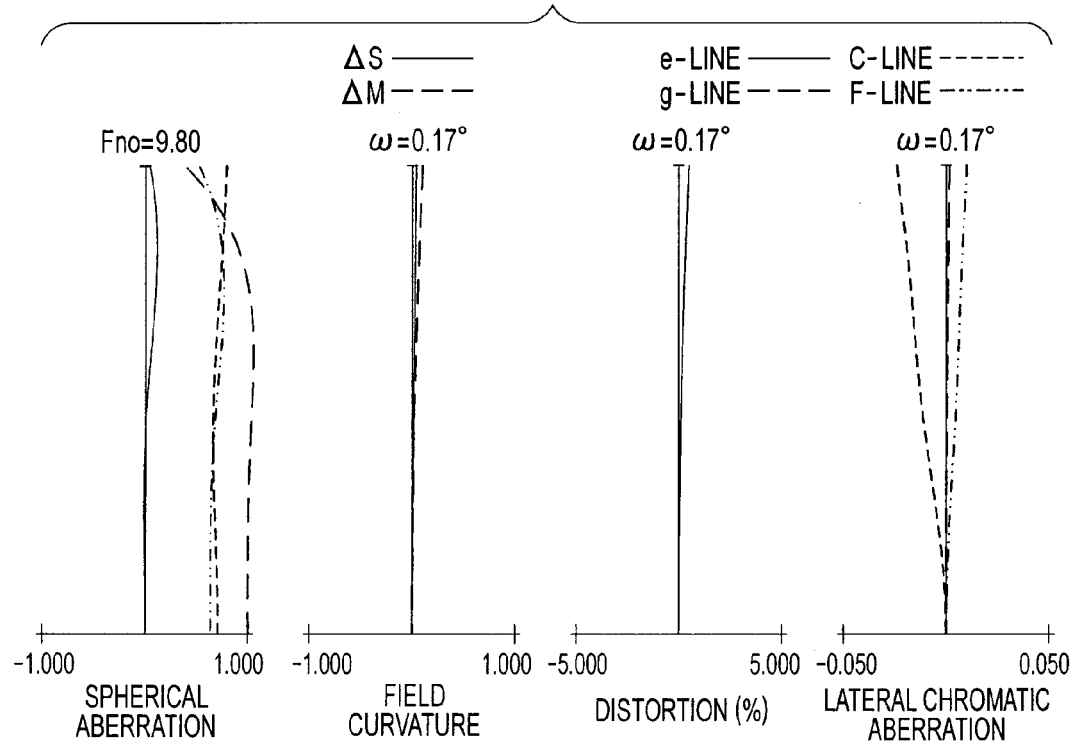
FIG. 12C is a longitudinal aberration diagram at the telephoto end when the extender lens IE is applied according to Numerical Embodiment 2 of the present invention.
Figure 13:
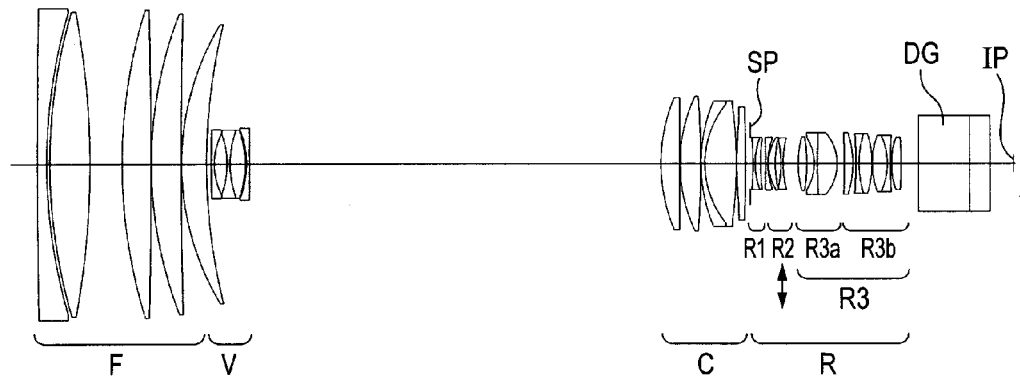
FIG. 13 is a lens cross sectional view at the wide-angle end according to Numerical Embodiment 3 of the present invention.
Figure 14A:
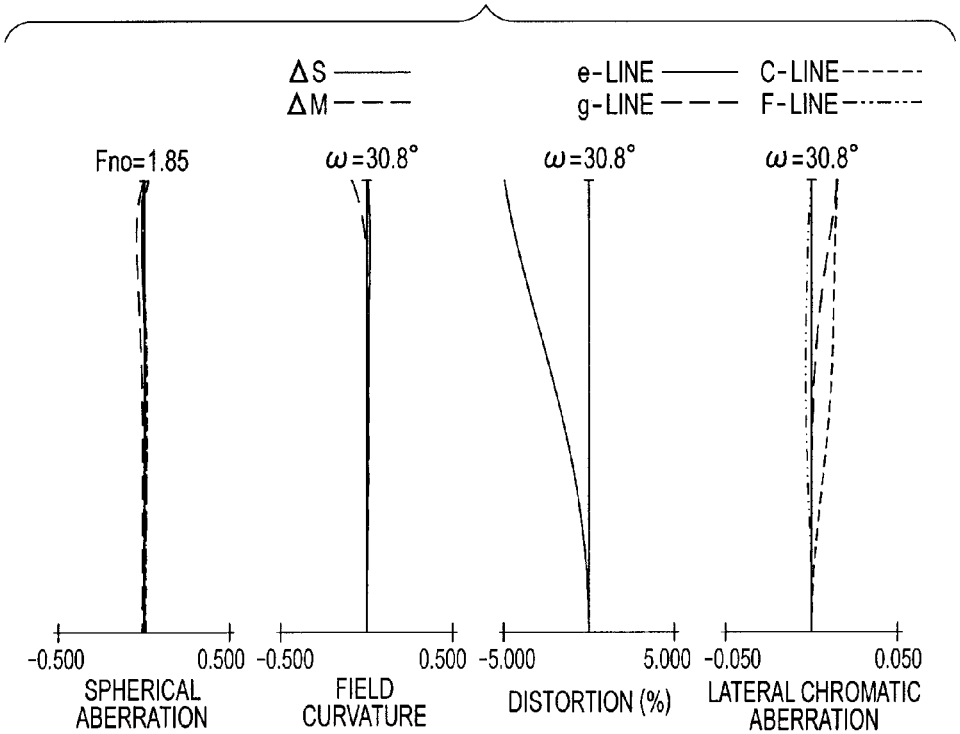
FIG. 14A is a longitudinal aberration diagram at the wide-angle end according to Numerical Embodiment 3 of the present invention.
Figure 14B:
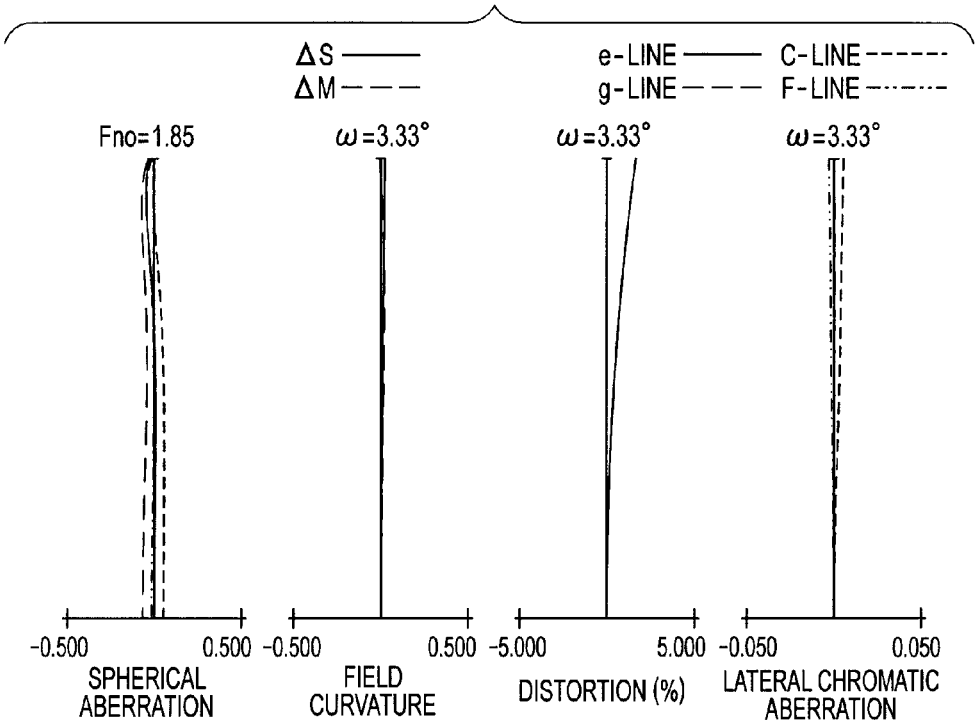
FIG. 14B is a longitudinal aberration diagram at a focal length of 94.44 mm according to Numerical Embodiment 3 of the present invention.
Figure 14C:
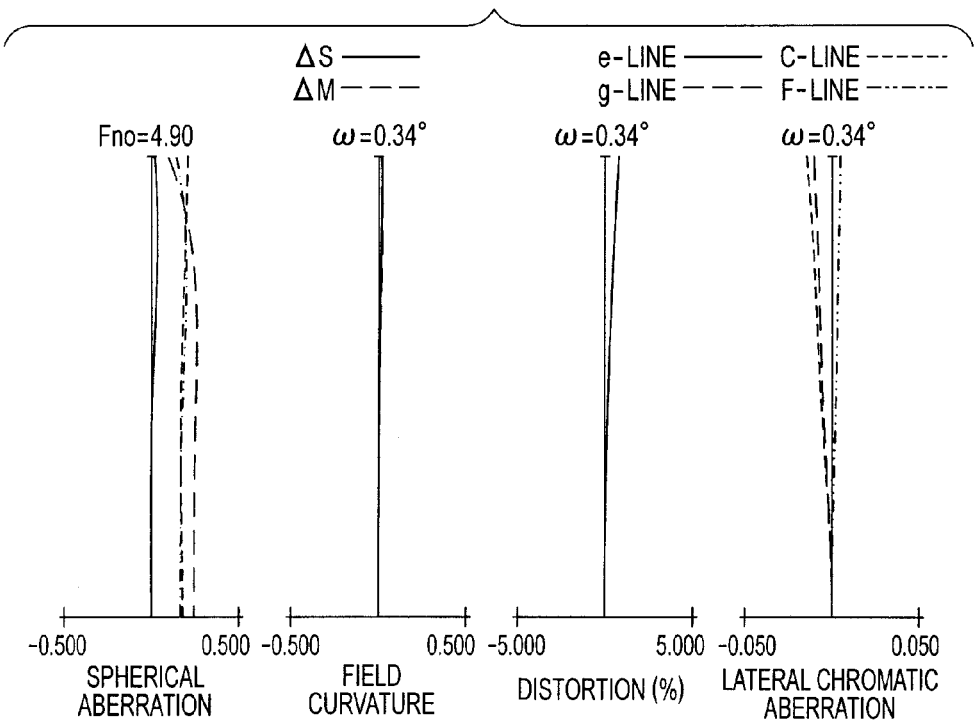
FIG. 14C is a longitudinal aberration diagram at the telephoto end according to Numerical Embodiment 3 of the present invention.

FIG. 11 is a lens cross sectional view at the wide-angle end when the first lens sub-subunit R3a is switched to the extender lens IE according to Numerical Embodiment 2 of the present invention. FIGS. 12A, 12B, and 12C are longitudinal aberration diagrams at the wide-angle end, at a focal length of 188.88 mm, and at the telephoto end when the first lens sub-subunit R3a is switched to the extender lens IE according to Numerical Embodiment 2 of the present invention. FIG. 13 is a lens cross sectional view at the wide-angle end according to Numerical Embodiment 3 of the present invention. FIGS. 14A, 14B and 14C are longitudinal aberration diagrams at the wide-angle end, at a focal length of 94.44 mm, and at the telephoto end according to Numerical Embodiment 3 of the present invention.

Figure 16:
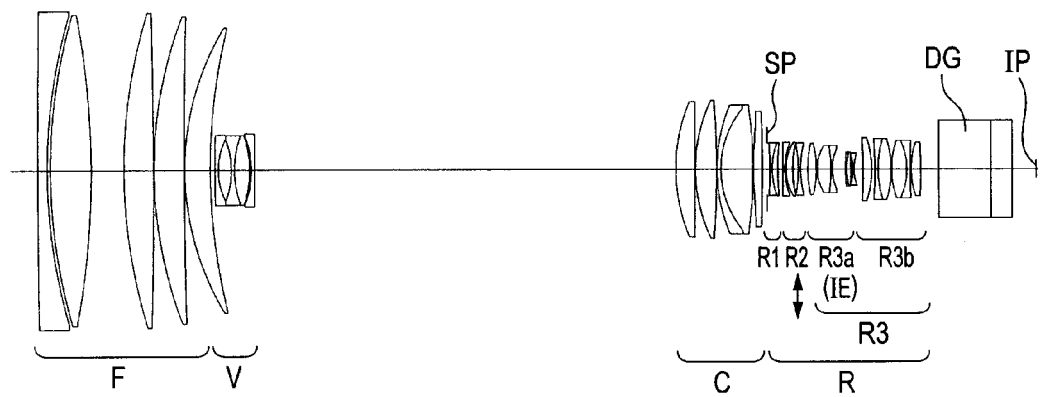
FIG. 16 is a lens cross sectional view at the wide-angle end when the extender lens IE is applied according to Numerical Embodiment 3 of the present invention.
Figure 17A:
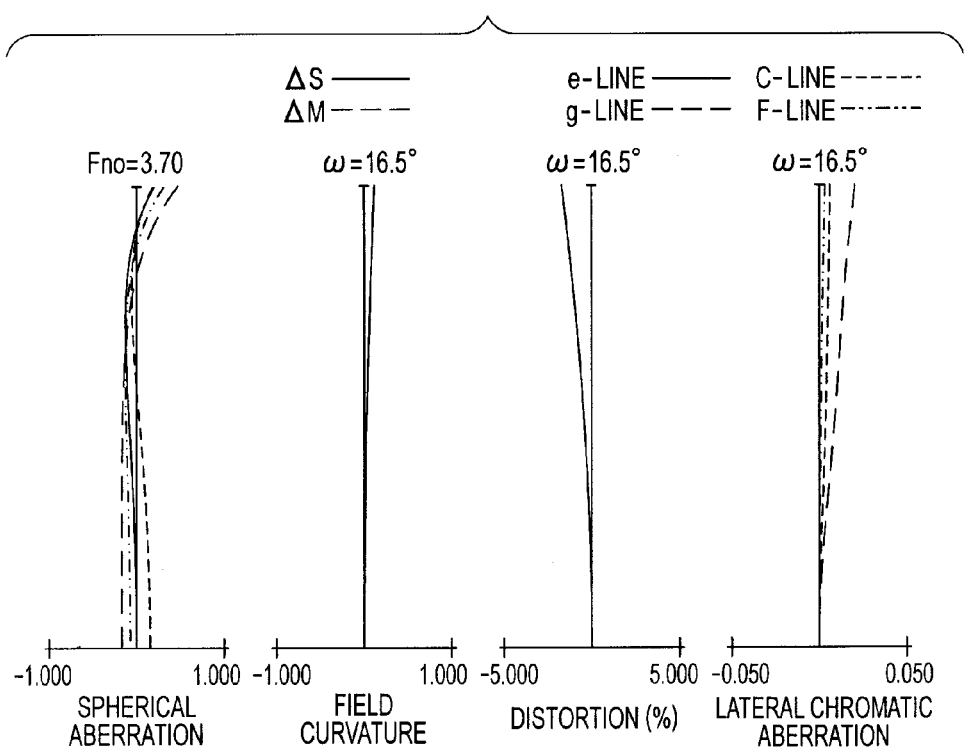
FIG. 17A is a longitudinal aberration diagram at the wide-angle end when the extender lens IE is applied according to Numerical Embodiment 3 of the present invention.
Figure 17B:
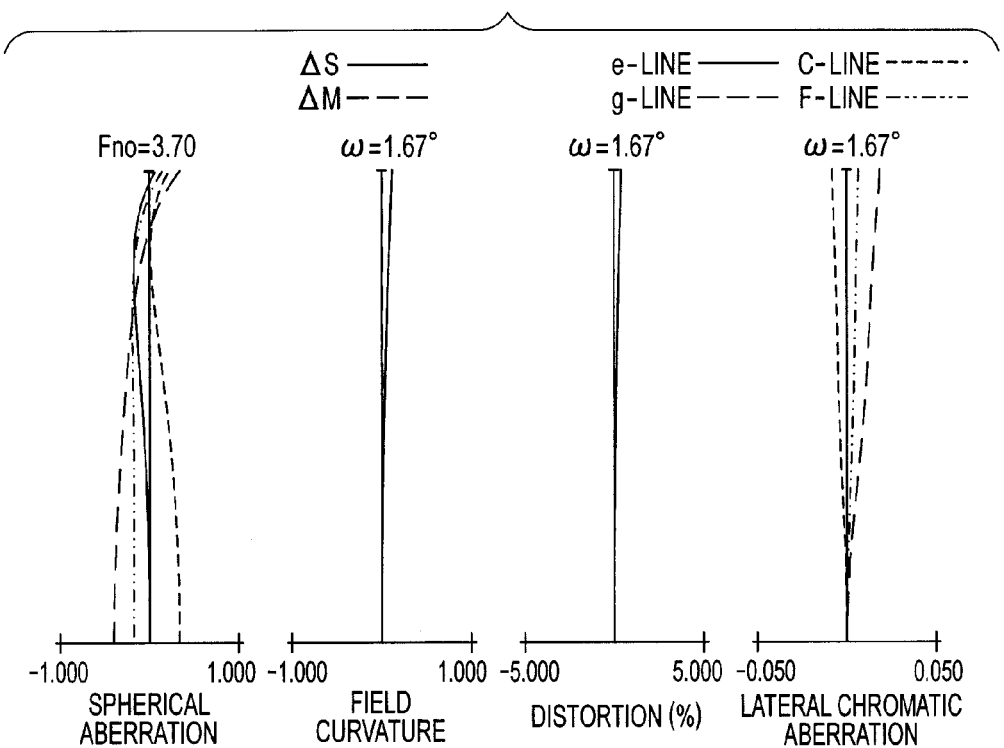
FIG. 17B is a longitudinal aberration diagram at a focal length of 188.88 mm when the extender lens IE is applied according to Numerical Embodiment 3 of the present invention.
Figure 17C:
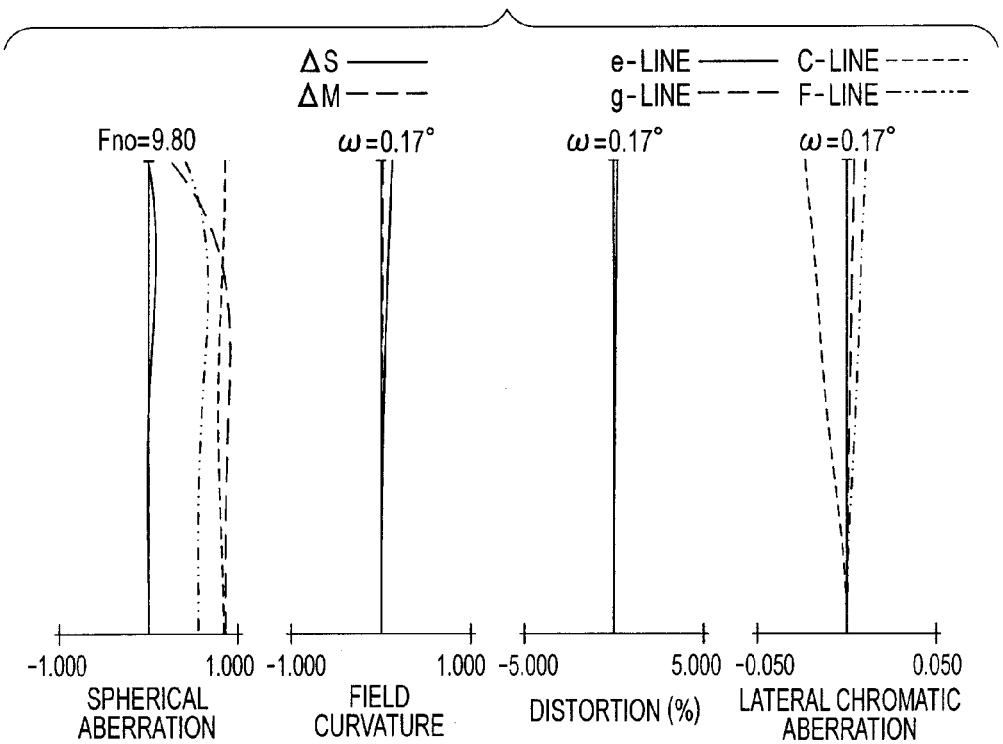
FIG. 17C is a longitudinal aberration diagram at the telephoto end when the extender lens IE is applied according to Numerical Embodiment 3 of the present invention.

FIGS. 15A and 15B are a lateral aberration diagram at the telephoto end and a lateral aberration diagram when the image stabilizing unit is decentered by 1.25 mm in the direction perpendicular to the optical axis at the telephoto end according to Numerical Embodiment 3 of the present invention. FIG. 16 is a lens cross sectional view at the wide-angle end when the first lens sub-subunit R3a is switched to the extender lens IE according to Numerical Embodiment 3 of the present invention. FIGS. 17A, 17B and 17C are longitudinal aberration diagrams at the wide-angle end, at a focal length of 188.88 mm, and at the telephoto end when the first lens sub-subunit R3a is switched to the extender lens IE according to Numerical Embodiment 3 of the present invention.

Figure 18:
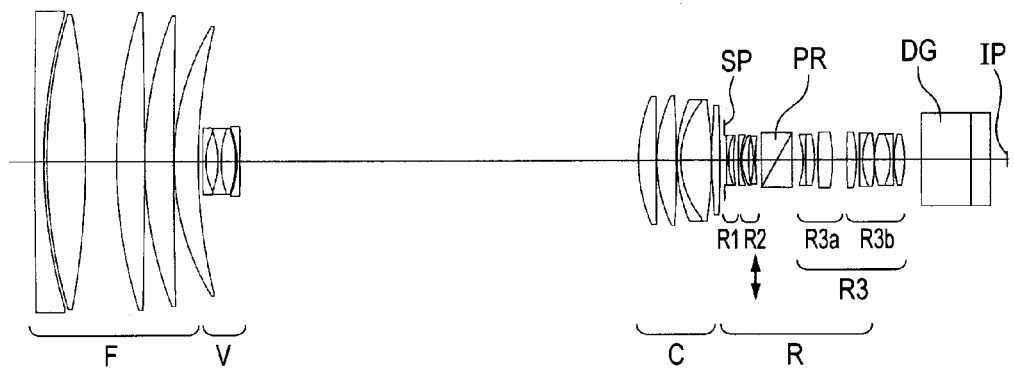
FIG. 18 is a lens cross sectional view at the wide-angle end according to Numerical Embodiment 4 of the present invention.
Figure 19A:
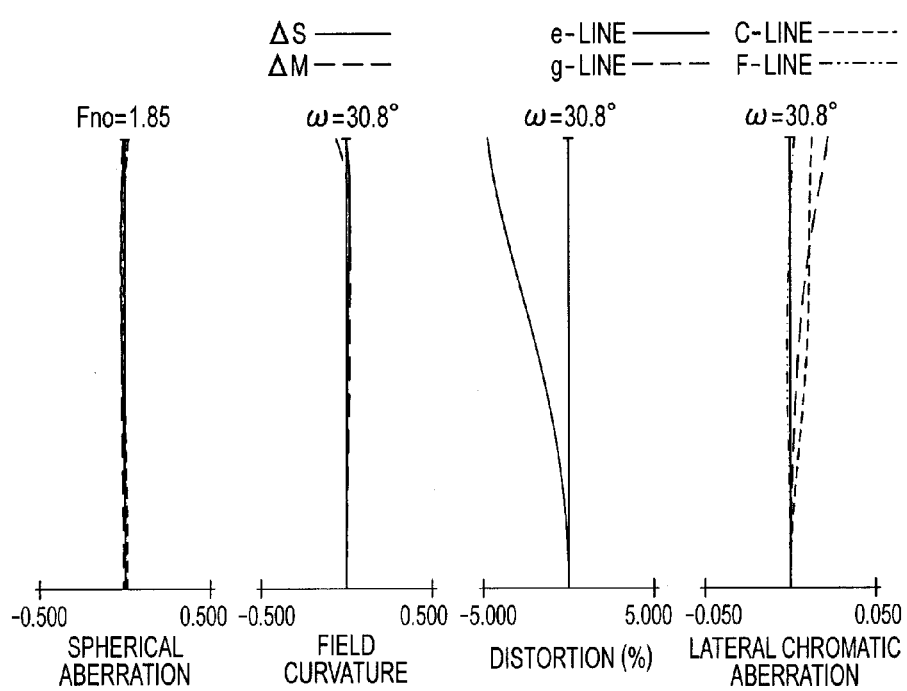
FIG. 19A is a longitudinal aberration diagram at the wide-angle end according to Numerical Embodiment 4 of the present invention.
Figure 19B:
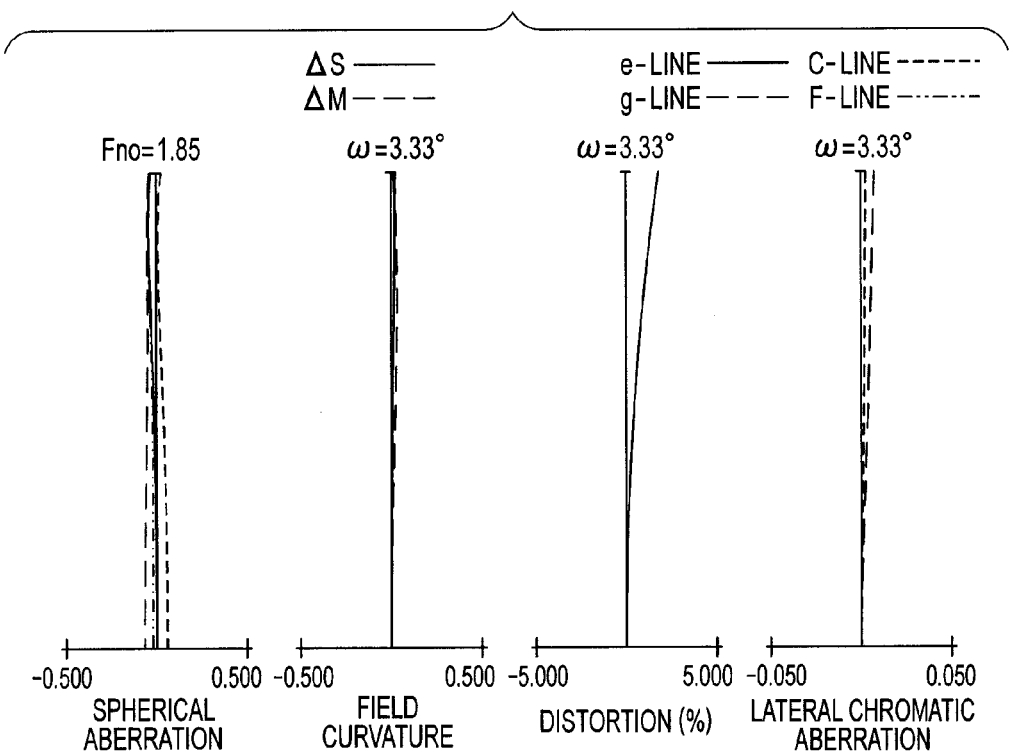
FIG. 19B is a longitudinal aberration diagram at a focal length of 94.44 mm according to Numerical Embodiment 4 of the present invention.
Figure 19C:
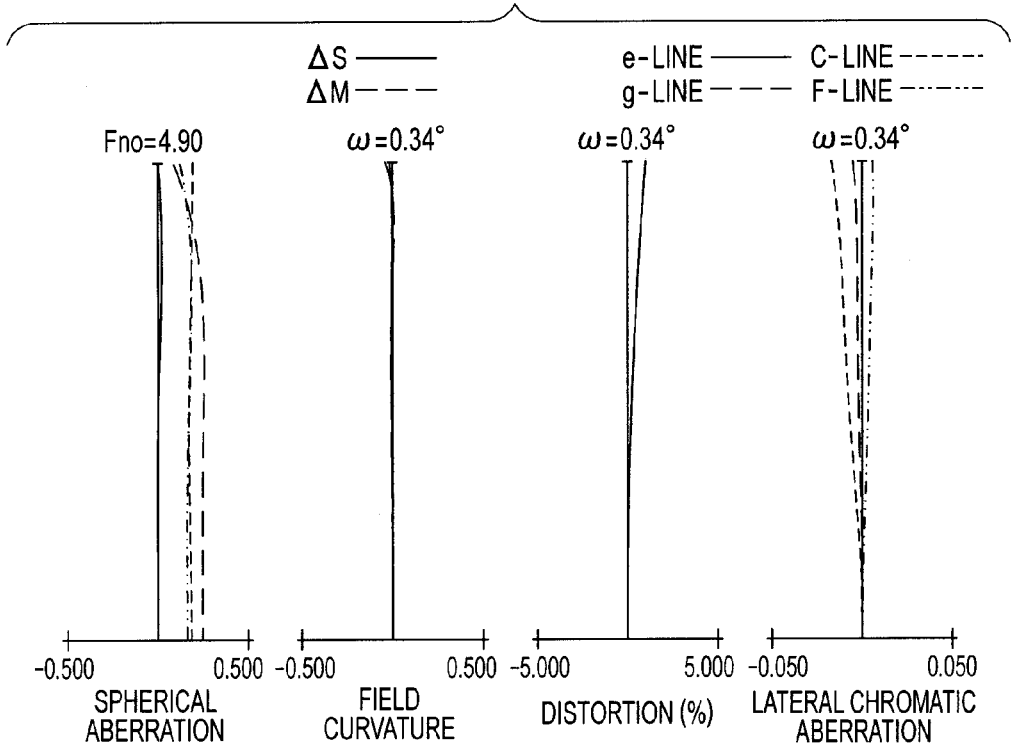
FIG. 19C is a longitudinal aberration diagram at the telephoto end according to Numerical Embodiment 4 of the present invention.
Figure 21:
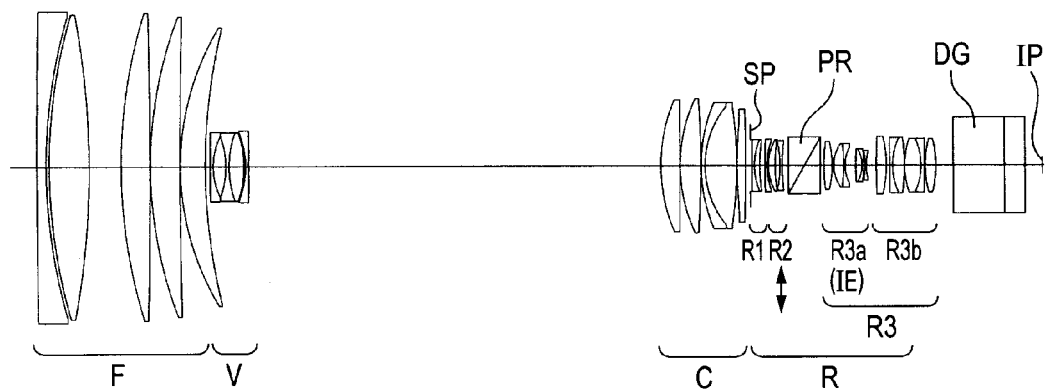
FIG. 21 is a lens cross sectional view at the wide-angle end when the extender lens IE is applied according to Numerical Embodiment 4 of the present invention.
Figure 22A:
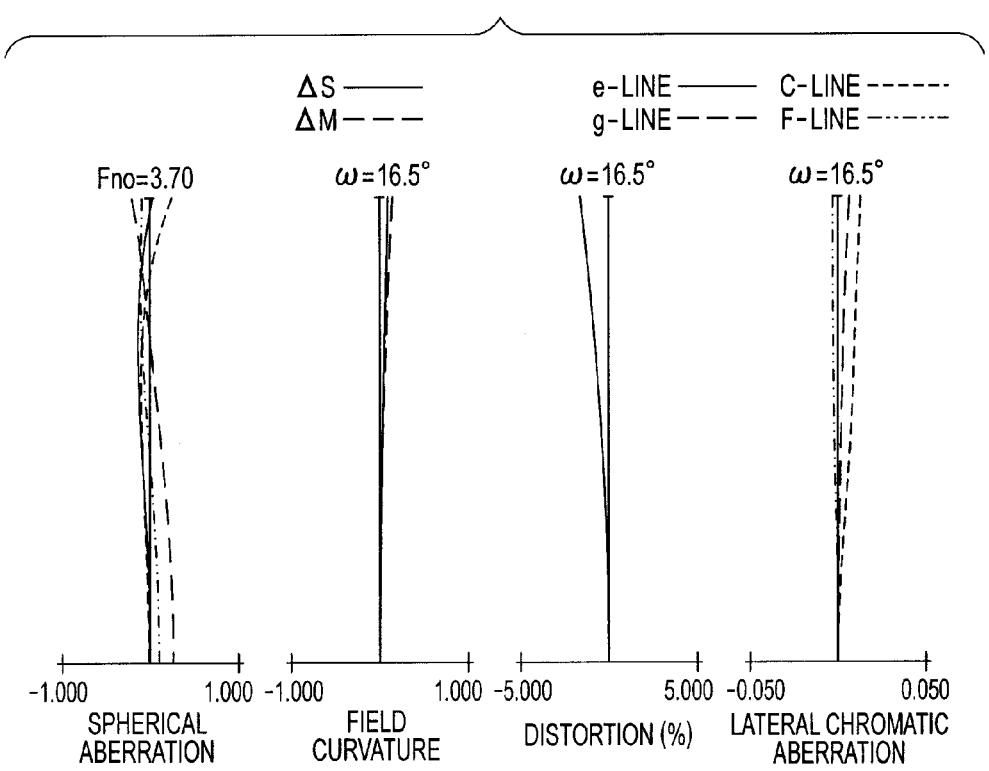
FIG. 22A is a longitudinal aberration diagram at the wide-angle end when the extender lens IE is applied according to Numerical Embodiment 4 of the present invention.
Figure 22B:
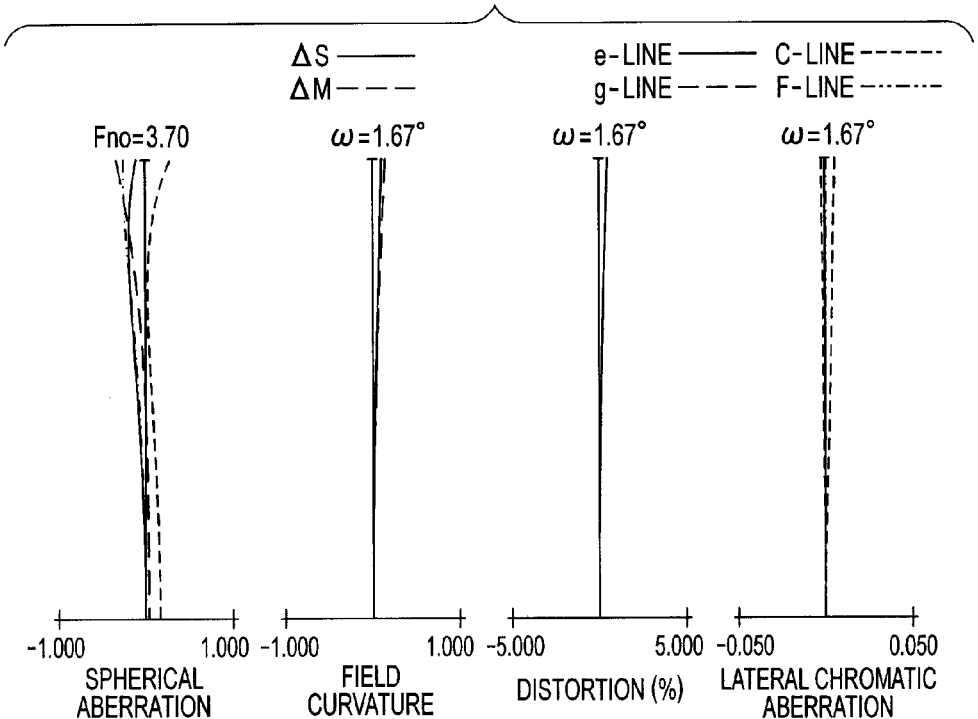
FIG. 22B is a longitudinal aberration diagram at a focal length of 188.88 mm when the extender lens IE is applied according to Numerical Embodiment 4 of the present invention.
Figure 22C:
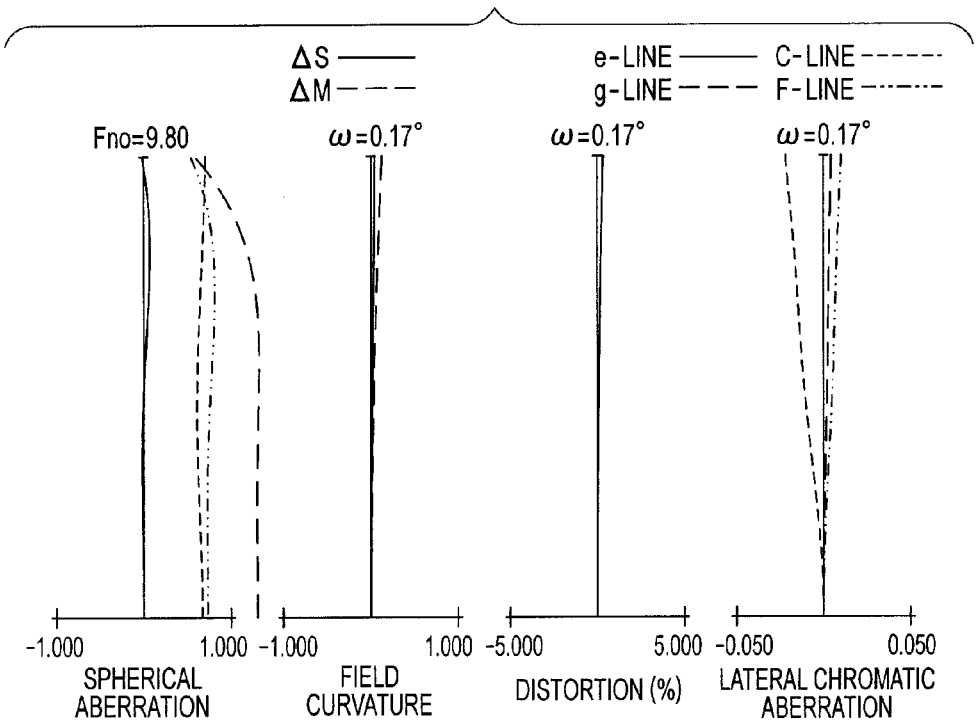
FIG. 22C is a longitudinal aberration diagram at the telephoto end when the extender lens IE is applied according to Numerical Embodiment 4 of the present invention.
Figure 23:
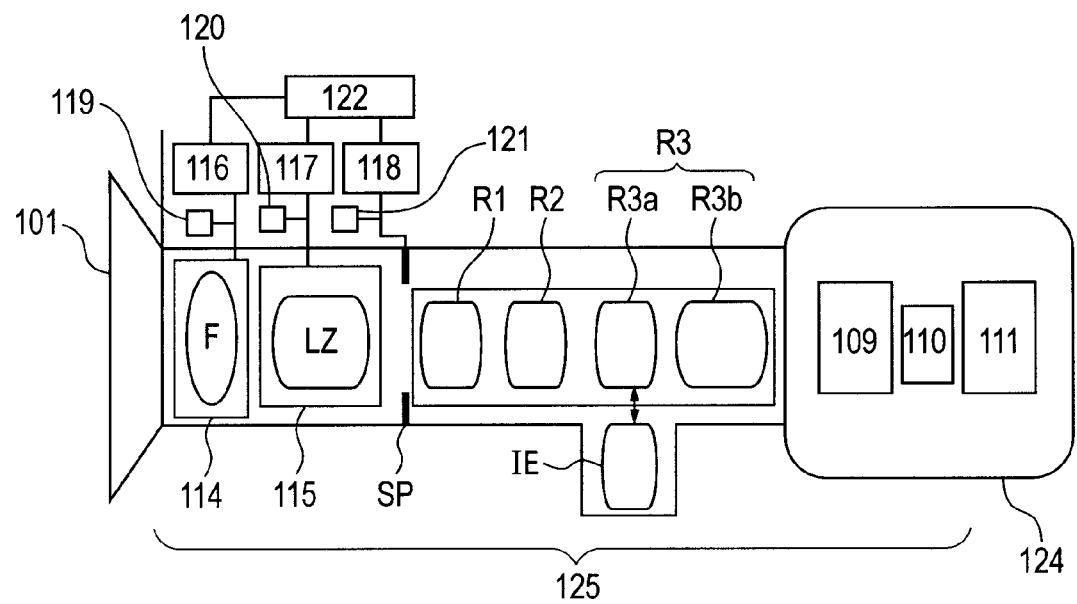
FIG. 23 is a schematic diagram of a main part of an image pickup apparatus according to the present invention.

FIG. 18 is a lens cross sectional view at the wide-angle end according to Numerical Embodiment 4 of the present invention. FIGS. 19A, 19B and 19C are longitudinal aberration diagrams at the wide-angle end, at a focal length of 94.44 mm, and at the telephoto end according to Numerical Embodiment 4 of the present invention. FIGS. 20A and 20B are a lateral aberration diagram at the telephoto end and a lateral aberration diagram when the image stabilizing unit is decentered by 1.75 mm in the direction perpendicular to the optical axis at the telephoto end according to Numerical Embodiment 4 of the present invention. FIG. 21 is a lens cross sectional view at the wide-angle end when the first lens sub-subunit R3a is switched to the extender lens IE according to Numerical Embodiment 4 of the present invention. FIGS. 22A, 22B and 22C are longitudinal aberration diagrams at the wide-angle end, at a focal length of 188.88 mm, and at the telephoto end when the first lens sub-subunit R3a is switched to the extender lens IE according to Numerical Embodiment 4 of the present invention. FIG. 23 is a schematic diagram of a main part of an image pickup apparatus according to the present invention.

In the lens cross sectional view, the zoom lens includes a focus unit (first lens unit) F having a positive refractive power that does not move for zooming, and a variator (second lens unit) V having a negative refractive power for magnification-varying, which is moved monotonously on the optical axis to the image plane side, so as to perform magnification-varying from the wide-angle end (WIDE) to the telephoto end (TELE).

The zoom lens further includes a compensator (third lens unit) C having a positive refractive power, which moves non-linearly on the optical axis to the object side so as to correct image plane variation due to magnification-varying from the wide-angle end to the telephoto end. In this embodiment, the variator V and the compensator C constitute a magnification-varying system (zoom portion). The magnification-varying system only needs to include two or more lens units including the variator V and the compensator C. For example, a structure in which the compensator C or the variator V might be divided into two or more lens units, which are moved independently of each other during zooming. The zoom lens further includes a fixed aperture stop SP and a relay lens unit (fourth lens unit) R which has positive refractive power as a whole and does not move for zooming.

The fourth lens unit R includes a fixed first lens subunit R1 having a negative refractive power and a second lens subunit R2 that moves so as to have a component perpendicular to the optical axis for image stabilizing, so as to correct image blur when the zoom lens is vibrated, that is, so as to displace the image in the direction perpendicular to the optical axis. The fourth lens unit R also includes a third lens subunit R3 having a positive refractive power. The third lens subunit R3 includes a first lens sub-subunit R3a that is inserted or removed into or from the optical path so as to be interchanged with the built-in extender IE as another lens unit so that a focal length range of the entire system is changed, and also includes a fixed second lens sub-subunit R3b.

The zoom lens further includes a glass block DG such as a color separation prism or an optical filter. An image plane IP corresponds to an image pickup plane of a solid-state image pickup element (photoelectric transducer). In the aberration diagram, spherical aberrations of g-line, e-line, C-line and F-line are indicated. Astigmatisms of a meridional image plane (meri) of the e-line and a sagittal image plane (sagi) of the e-line are indicated. Lateral chromatic aberrations of g-line, C-line and F-line are indicated. F-number is denoted by Fno, and a half angle of field is denoted by ω. When the aberrations in Numerical Embodiments to be described later are expressed by millimeter (mm) in each of the aberration diagrams, the spherical aberration, the astigmatism, the distortion and the lateral chromatic aberration are expressed in the scale of 0.5 mm, 0.5 mm, 5%, and 0.05 mm, respectively.

Note that, the spherical aberration and the astigmatism when the extender is inserted are expressed in the scale of 1.0 mm.

Note that, the wide-angle end and the telephoto end in the following embodiments mean zoom positions when the second lens unit V for magnification-varying is positioned at each end of the mechanically movable range on the optical axis.

First, in the zoom lens having the image stabilizing function of the present invention, a generation of decentering aberration when a partial system in the optical system is decentered in the direction perpendicular to the optical axis is described from a standpoint of aberration theory with reference to the method described by Matsui (the 23$^{rd}$ meeting proceeding of the Japan Society of Applied Physics).

An aberration amount Δ'Y of the entire system when a lens unit p of the image taking lens is decentered in parallel by E is, as expressed by the expression (a), a sum of an aberration amount ΔY before the decentering and a decentering aberration amount ΔY(E) generated by the decentering. Here, the decentering aberration amount ΔY(E) is expressed by a first-order decentering coma (IIE), a first-order decentering astigmatism (IIIE), a first-order decentering field curvature (PE), a first-order decentering distortion (VE1), a first-order decentering distortion additional aberration (VE2) and a first-order origin movement ΔE, as expressed by the expression (b). Here, when the focal length of the entire system is normalized to 1, an incident angle and an exit angle of an axial marginal beam of a paraxial beam with respect to the decentered lens unit are denoted by $α_p$ and $α_p'$, respectively. Further, an incident angle of a principal ray that passes through the center of the pupil is expressed as $\overline{α}_p$ and an exit angle of a principal ray that passes through the center of the pupil is expressed as $\overline{α}_p'$.

Then, aberrations (IIE) to (ΔE) in the expressions (c) to (h) are expressed using aberration coefficients Ip, IIp, IIIp, Pp and Vp of the decentered lens unit and aberration coefficients Iq, IIq, IIIq, Pq and Vq of the lens system on the image side of the decentered lens unit. In the same manner, a chromatic aberration amount ΔcYa of the entire system when the lens unit p is decentered in parallel by E is, as expressed in the expression (i), a sum of an aberration ΔcY before the parallel decentering and an aberration ΔcY(E) generated by the decentering. Here, the aberration ΔcY before the parallel decentering and the decentering aberration ΔcY(E) can be expressed by the expression (j) and the expression (k), respectively, using the axial chromatic aberration L, the lateral chromatic aberration T and the first-order decentering chromatic aberration Te. In addition, the first-order decentering chromatic aberration coefficient (TE) in the expression (1) can be expressed by using chromatic aberration coefficients Lp and Tp of the lens unit p and chromatic aberration coefficients Lq and Tq of the entire lens units disposed on the side of image plane of the lens unit, which is decentered in parallel.

$$Δ'Y = ΔY + ΔY(E) \tag{a}$$

$$ΔY(E) = -\frac{E}{2α_k'}\big[R^2(2 + \cos2\phi_R)(IIE) + 2R(N_1\tanω)$$
$$[\{2\cos(\phi_R - \phi_ω) + \cos(\phi_R + \phi_ω)\}(IIIE) + \cos\phi_R\phi_ω(PE)] +$$
$$(N_1\tanω)^2\{(2 + 2\cos\phi_ω)(VE1) - (VE2)\}\big] - \frac{1}{2α_k'}\{E(ΔE)\} \tag{b}$$

$$(IIE) = α_p'II_q - α_p(II_p + II_q) - \overline{α}_p'I_q + \overline{α}_p(I_p + I_q) \tag{c}$$

$$(IIIE) = α_p'III_q - α_p(III_p + III_q) - \overline{α}_p'II_q + \overline{α}_p(II_p + II_q) \tag{d}$$

$$(PE) = α_p'P_q - α_p(P_p + P_q) \tag{e}$$

$$(VE1) = α_p'V_q - α_p(V_p + V_q) - \overline{α}_p'III_q + \overline{α}_p(III_p + III_q) \tag{f}$$

$$(VE2) = \overline{α}_p'P_q - \overline{α}_p(P_p + P_q) \tag{g}$$

$$(ΔE) = -2(α_p' - α_p) \tag{h}$$

$$ΔcYa = ΔcY + ΔcY(E) \tag{i}$$

$$ΔcY = -\frac{1}{α_k'}\{LR\cos\phi_R + TN\tanω\cos\phi_ω\} \tag{j}$$

$$ΔcY(E) = -\frac{E}{α_k'}(TE) \tag{k}$$

$$(TE) = α_p'T_q - α_p(T_p + T_q) - \overline{α}_p'L_q + \overline{α}_p(L_p + L_q) \tag{l}$$

Of those, the first-order origin movement (ΔE) indicates displacement of the image by the decentering, and imaging performance is affected by (IIE), (IIIE), (PE) and (TE).

In order to reduce generation of the decentering aberration, firstly, it is important to reduce the decentering amount E of the lens unit p as expressed in the expression (b).

Secondly, in order to make very small the decentering aberration coefficients of the lens unit p expressed in the expressions (c) to (g), it is necessary to set the various aberration coefficients Ip, IIp, IIIp, Pp and Vp of the lens unit p to small values or to set the various aberration coefficients with good balance so that the various aberration coefficients are canceled with each other. In particular, it is necessary to appropriately set paraxial amounts and the aberration coefficients of the lens unit p to be decentered in parallel and of the lens units q disposed on the image plane side thereof, respectively, so that the decentering aberration coefficients expressed in the above expressions (c) to (g) become small values. In other words, in order to reduce deterioration of image quality in the central image generated by the image stabilizing, it is necessary to appropriately correct the first-order decentering coma mainly expressed by the expression (c). In addition, at the same time, in order to appropriately correct deterioration of image quality in the peripheral image generated by the image stabilizing, it is necessary to appropriately correct the first-order decentering field curvature mainly expressed by the expression (d). As a matter of course, it is naturally necessary to appropriately correct each of the other various aberrations.

Thirdly, in order to set the decentering chromatic aberration coefficient (TE) expressed by the expression (1) to be very small, it is necessary to appropriately set each of the chromatic aberration coefficients of the lens unit p and the entire lens units q disposed on the image plane side thereof.

The zoom lens having the image stabilizing function according to the present invention is constituted in consideration of the above-mentioned first to third matters.

Hereinafter, focus variation is described, which is generated when the partial system in the optical system is shifted in the direction along the optical axis. A focus movement amount $\Delta SK(\sigma)$ in the case where the partial lens unit p of the image taking lens is shifted by a predetermined amount $\delta$ in the optical axis direction is expressed by the following expression:

$$\Delta SK(\delta) = (1 - \beta_p^2) \times \beta_q \quad (m)$$

where $\beta_p$ represents a lateral magnification of the lens unit p, and $\beta_q$ represents a lateral magnification of the lens units q. In other words, as the absolute value of the lateral magnification $\beta_p$ of the lens unit p is closer to 1, the value of $\Delta SK(\sigma)$ becomes smaller and the focus variation with respect to the shift of the lens unit p in the optical axis direction can be reduced. Here, the lateral magnification $\beta_p$ of the lens unit p is expressed by the following expression, based on an incident conversion angle of inclination from the lens unit on the object side of the lens unit p, a beam incident height $h_p$ and a refractive power $\phi_p$ of the lens unit p.

$$\beta_p = \alpha_p / \alpha'_p = \alpha_p / (\alpha_p + h_p \phi_p) \quad (n)$$

Therefore, in order to control $\Delta SK(\sigma)$ appropriately, it is necessary to control power arrangement of the lens units on the object side of the image stabilizing unit according to the refractive power of the image stabilizing unit. The zoom lens having the image stabilizing function according to the present invention is constituted in consideration of the above-mentioned point, too. Here, it is understood from the expression (m) that the lateral magnification of the lens units q also contributes to $\Delta SK(\sigma)$. The incident conversion angle of inclination $\alpha_q$ to the lens units q is equal to $\alpha_p'$, and the lens units q in the zoom lens of the present invention are disposed on the most image side. Therefore, when $\beta_p$ is determined, $\beta_q$ is also determined at the same time. Thus, it is important to control the incident conversion angle of inclination $\alpha_p$ to the image stabilizing unit.

Note that, the term "sensitivity" as used herein means $\Delta(\sigma)/\sigma$ in which a noted element is varied by $\Delta(\sigma)$ when a lens thickness, a curvature radius, the decentering amount of the lens or the like is varied by a very small amount $\delta$.

The zoom lens having the image stabilizing function of the present invention includes, in order from the object side to the image side, the first lens unit F having a positive refractive power that does not move for zooming, the second lens unit V having a negative refractive power that moves during magnification-varying, and the third lens unit C having a positive refractive power for correcting image plane variation due to magnification-varying. The zoom lens further includes the fourth lens unit R having a positive refractive power that does not move for zooming. Further, the zoom lens of each embodiment has the image stabilizing function for correcting blur of a taken image due to vibration of the zoom lens by moving the second lens subunit R2, which has a negative refractive power and is formed of a sub lens unit constituting the fourth lens unit R, in the plane perpendicular to the optical axis.

Further, on the object side of the second lens subunit R2, the first lens subunit R1 is provided, which has a negative refractive power and includes at least one positive lens and at least one negative lens. Focal lengths of the first lens subunit R1 and the second lens subunit R2 are denoted by f41 and f42, respectively. In this case, the following conditional expression is satisfied.

$$1.2 < f41/f42 < 3.5 \quad (1)$$

FIG. 4 illustrates a concept of paraxial refractive power arrangement of the zoom lens having the image stabilizing function of each embodiment. Numerals and symbols of FIG. 4 is the same as illustrated in the lens cross sectional views. A front lens unit FR having a negative refractive power is a combination of the first lens subunit R1 and the second lens subunit R2, and a rear lens unit RR is formed of the third lens subunit R3.

As illustrated in FIG. 4, an image point I' of an object formed by the first lens unit F to the third lens unit C is not changed by zooming (magnification-varying). Here, considering an imaging relationship of only the fourth lens unit R, an arrangement thereof and a paraxial tracking value are not changed regardless of movements of the second lens unit V and the third lens unit C.

Therefore, by disposing the image stabilizing lens unit in a part of the fourth lens unit R which is not moved for magnification-varying and disposed on the image side of the lens unit which moves during magnification-varying, variations of the decentering aberration coefficients due to the magnification-varying can be prevented.

In addition, in this embodiment, the first lens subunit R1 that is a fixed lens unit having a negative refractive power is disposed on the image side of the third lens unit C having a positive refractive power, and a focal length ratio between the first lens subunit R1 and the second lens subunit R2 is defined as expressed in the conditional expression (1). FIG. 5 illustrates a schematic diagram of the lens structure in the case where the first lens subunit R1 is disposed on the object side of the second lens sub unit R2 (IS) for image stabilizing as a structure of the fourth lens unit R.

In the structure illustrated in FIG. 5, it is possible to change an incident conversion angle of inclination $\alpha$IS of the axial marginal beam with respect to the second lens sub unit R2 without changing the structure of the magnification-varying system or the second lens subunit R2 for image stabilizing. According to the expression (n), it is possible to change the lateral magnification $\beta$IS of the second lens subunit R2 by changing the incident conversion angle of inclination $\alpha$IS. Therefore, by introducing the first lens subunit R1 as a front relay lens unit, it is possible to control focus sensitivity to the shift of the second lens subunit R2 in the optical axis direction without changing the magnification-varying system (the second lens unit V and the third lens unit C) and the second lens subunit R2 for image stabilizing.

Thus, in this embodiment, sensitivity of focus variation to the shift in the optical axis of the second lens subunit R2 for image stabilizing is reduced. However, if the incident conversion angle of inclination $\alpha$IS is simply changed, the paraxial amount or the aberration coefficient of the lens units disposed on the image side of the second lens subunit R2 for image stabilizing will change. Therefore, in this embodiment, from a standpoint of aberration theory, a relationship between the focal length f41 and the focal length f42 is defined as expressed in the conditional expression (1) so that the incident conversion angle of inclination αIS becomes an optimal value.

Here, the conditional expression (1) defines the structure of the entire system and the power arrangement of the fourth lens unit R including the second lens subunit R2 for image stabilizing, so as to reduce the focus variation due to the image stabilizing action and to reduce the overall size of the entire image stabilizing device.

When f41/f42 is equal to or larger than the upper limit of the conditional expression (1), the focal length of the first lens subunit R1 is larger than the second lens subunit R2, and the imaging magnification β42 of the second lens subunit R2 is deviated from −1 in the negative direction. On the contrary, when f41/f42 is equal to or smaller than the lower limit, the imaging magnification β42 is deviated from −1 in the positive direction. In this way, when f41/f42 is out of the range of the conditional expression (1), it becomes difficult to control the lateral magnification of the second lens subunit R2, and it becomes difficult to reduce the focus variation generated by the image stabilizing action.

Here, it is preferred that the imaging magnification β42 of the second lens subunit R2 satisfy the following conditional expression under the conditional expression (1).

$$0.5<|\beta 42|<15 \tag{10}$$

In each embodiment, it is more preferred to set the numerical value range of the conditional expression (1) as follows.

$$1.3<f41/f42<2.5 \tag{1a}$$

In addition, it is preferred to set the numerical value range of the conditional expression (10) as follows.

$$0.6<|\beta 42|<12.0 \tag{10a}$$

As described above, according to each embodiment, it is possible to provide the zoom lens that can reduce the focus variation due to the image stabilizing drive and reduce the size and weight of the image stabilizing unit while maintaining good optical performance also in the image stabilizing.

In each embodiment, with the structure described above, the focus variation in the image stabilizing is corrected appropriately, and good optical performance is obtained. It is more preferred to satisfy one or more of the following conditions.

The second lens subunit R2 is formed of a single positive lens and a single negative lens.

Alternatively, the second lens subunit R2 is formed of two negative lenses and a single positive lens, and in this case, an average value of specific gravities of the materials of the two negative lenses is denoted by dave (g/cm³).

The first lens subunit R1 is formed of a single negative lens and a single positive lens, and the Abbe number of the material of the positive lens is denoted by νd41p while the Abbe number of the material of the negative lens is denoted by νd41n.

The average Abbe number of the materials of the positive lenses among lenses constituting the second lens subunit R2 is denoted by νd42p, and the average Abbe number of the materials of the negative lenses among the lenses constituting the second lens subunit R2 is denoted by νd42n. The average Abbe number of the materials of the positive lenses among lenses constituting the third lens subunit R3 is denoted by νd43p, and the average Abbe number of the materials of the negative lenses among the lenses constituting the third lens subunit R3 is denoted by νd43n.

During zooming from the wide-angle side to the telephoto side, the second lens unit V moves on the optical axis from the object side to the image side, and the third lens unit C moves on the optical axis from the image side to the object side and passes through the zoom position having an imaging magnification of −1 during the movement. The maximum value and the minimum value of the lateral magnification of the second lens unit V are denoted by Z2max and Z2min, and the zoom ratio (lateral magnification) of the zoom lens of the entire system is denoted by Z. In this case, it is preferred to satisfy one or more of the following conditions.

$$3.0 \ (g/cm^3)<dave<5.1 \ (g/cm^3) \tag{2}$$

$$10<|\nu d41p-\nu d41n|<25 \tag{3}$$

$$10<|\nu d42p-\nu d42n|<25 \tag{6}$$

$$10<|\nu d43p-\nu d43n|<25 \tag{7}$$

$$10<Z2max/Z2min \tag{8}$$

$$0.13<Z2max/(Z2min\times Z) \tag{9}$$

In each embodiment, the structure of the second lens subunit R2 for image stabilizing, in particular, the number of negative lenses of the second lens subunit R2, and the average value of the specific gravities of the materials of the negative lenses are defined appropriately.

The second lens subunit R2 may be formed of a single positive lens and a single negative lens, or a single positive lens and two negative lenses. If the second lens subunit R2 includes two negative lenses, the average value dave (g/cm³) of specific gravities of the materials of the negative lenses is set to a small value so that the conditional expression (2) is satisfied.

The weight of the second lens subunit R2 is determined as a sum of products of the volumes of the lenses and the specific gravities of lenses constituting the second lens subunit R2. Therefore, the number of negative lenses constituting the second lens subunit R2 is defined, and the average value of specific gravities of the negative lenses is defined, to thereby define the weight of the second lens subunit R2.

Here, because the second lens subunit R2 has a negative refractive power as a whole, the negative lens constituting the second lens subunit R2 is required to be a low dispersion lens. In addition, in order to appropriately reduce various aberrations due to decentering, in particular, decentering coma, the material of the lens constituting the second lens subunit R2 is required to have high refractive index. An example of the glass material that satisfies the above-mentioned two conditions is S-LAH glass (trade name of OHARA INC.), which is dense lanthanum flint glass.

Table 3 shows the refractive index, the density and the Abbe number of the S-LAH glass (trade name of OHARA INC.). It is understood from Table 3 that the higher the refractive index of glass is, the larger its density is. Further, it is understood that the higher the refractive index of glass is, the smaller its Abbe number is. Therefore, the use of a small density glass means the use of a lower refractive index glass, which makes it difficult to correct the decentering coma. In addition, because the Abbe number of glass of the negative lens becomes large, a sharing relationship of the lateral chromatic aberration coefficients in the fourth lens unit R is lost and it becomes difficult to reduce asymmetry of colors.

In this embodiment, the first lens subunit R1 involves sharing of the aberration coefficients of the fourth lens unit R. Thus, even if the negative lens of the second lens subunit R2 is formed of glass having a small density, the decentering coma or the decentering lateral chromatic aberration can be corrected easily while maintaining the aberration correction relationship in the fourth lens unit R.

In the case where the number of the negative lenses constituting the second lens subunit R2 is two, when the value "dave" is equal to or larger than the upper limit of the conditional expression (2), the weight of the second lens subunit R2 increases, and it becomes difficult to prevent a decrease in trackability of the image stabilizing with respect to image blur or an increase in size of the drive mechanism. On the contrary, when the value "dave" is equal to or smaller than the lower limit of the conditional expression (2), the refractive index of the material of the lenses constituting the image stabilizing lens unit is decreased and the Abbe number is increased. Therefore, it becomes difficult to correct the decentering coma and the decentering lateral chromatic aberration.

The conditional expression (3) defines a difference between the Abbe number vd41p of the material of the positive lens constituting the fixed first lens subunit R1 disposed on the object side of the second lens subunit R2 and the Abbe number vd41n of the material of the negative lens constituting the fixed first lens subunit R1.

When |vd41p−vd41n| is equal to or larger than the upper limit of the conditional expression (3), the chromatic aberration coefficient sharing balance in the fourth lens unit R is lost, so that the correction of the decentering chromatic aberration coefficient of the second lens subunit R2 becomes difficult. On the contrary, When |vd41p−vd41n| is equal to or smaller than the lower limit of the conditional expression (3), the power of the single lens constituting the first lens subunit R1 increases so as to achieve chromatic aberration coefficient sharing in the fourth lens unit R, with the result that the total thickness of the glass increases.

In the zoom lens of each embodiment, the aberration coefficient sharing values of the second lens subunit R2 and the third lens subunit R3 in addition to the first lens subunit R1 are defined to be within an appropriate range, to thereby reduce color asymmetry in the image stabilizing.

Here, as understood from the relationship of the expressions (c) to (g), in order to correct decentering aberration due to the second lens subunit R2 for image stabilizing, it is necessary to appropriately control each aberration coefficient sharing value of the second lens subunit R2. Therefore, it is preferred to constitute the second lens subunit R2 of at least one positive lens and one negative lens. Thus, it is easy to control each aberration coefficient sharing value of the second lens subunit R2. Otherwise, it becomes difficult to correct the decentering aberration, and various decentering aberrations such as the decentering coma and the decentering field curvature are generated easily in image stabilizing.

The conditional expressions (6) and (7) are necessary for appropriately controlling each chromatic aberration coefficient sharing value so that the decentering chromatic aberration due to the second lens subunit R2 is corrected based on the relationship of the conditional expression (1).

When |vd42p−vd42n| is equal to or larger than the upper limit of the conditional expression (6) and/or |vd43p−vd43n| is equal to or larger than the upper limit of the conditional expression (7), the chromatic aberration coefficient sharing balance in the fourth lens unit R is lost, so that correction of the decentering chromatic aberration coefficient of the second lens subunit R2 becomes difficult. Thus, it becomes difficult to reduce color asymmetry in decentering. On the contrary, when |vd42p−vd42n| is lower than the lower limit of the conditional expression (6) and/or |vd43p−vd43n| is equal to or smaller than the lower limit of the conditional expression (7), power of the single lens constituting the second lens subunit R2 and/or the third lens subunit R3 is increased for achieving the chromatic aberration coefficient sharing in the fourth lens unit R. Therefore, the total lens thickness is increased, which is not preferred.

The conditional expressions (8) and (9) are necessary for easily obtaining a high zoom ratio of 60 or larger efficiently.

In the zoom lens of each embodiment, during zooming from the wide-angle side to the telephoto side, the second lens unit V moves on the optical axis from the object side to the image side, while the third lens unit C moves on the optical axis from the image side to the object side and passes through the zoom position having an imaging magnification of −1 during the movement. In this case, the second lens unit V and the third lens unit C satisfy the conditional expressions (8) and (9).

The conditional expressions (8) and (9) define a ratio between a change of lateral magnification of the second lens unit V due to magnification-varying and a magnification ratio. By giving lateral magnification change not only to the second lens unit V but also to the third lens unit C, a high zoom ratio of 60 or larger is achieved efficiently. If the conditional expressions (8) and (9) are not satisfied, it becomes difficult to obtain a zoom lens having a high zoom ratio.

It is more preferred in each embodiment that the numerical value ranges of the conditional expressions (2), (3) and (6) to (9) be set as follows.

$$3.50 \text{ (g/cm}^3) < dave < 5.08 \text{ (g/cm}^3) \tag{2a}$$

$$11.0 < |vd41p - vd41n| < 20.0 \tag{3a}$$

$$15 < |vd42p - vd42n| < 25 \tag{6a}$$

$$12 < |vd43p - vd43n| < 20 \tag{7a}$$

$$13 < Z2max/Z2min < 20 \tag{8a}$$

$$0.15 < Z2max/(Z2min \times Z) < 0.20 \tag{9a}$$

Hereinafter, an image pickup apparatus including the zoom lens of the present invention is described.

The image pickup apparatus of the present invention includes an image pickup element for receiving an image formed by the zoom lens. An equivalent length in air of a distance between the image plane and the lens surface on the most image plane side of the lens constituting the fourth lens unit R is denoted by SK, and an image size of the image pickup element is denoted by Im. The incident conversion angle of inclination of the beam with respect to the lens surface on the most object side of the lenses constituting the second lens subunit R2 is denoted by αIS (rad (radians)), and the exit converted inclination angle of the beam from the lens surface on the most image side of the lenses constituting the second lens subunit R2 is denoted by α'IS (rad (radians)). In this case, it is preferred to satisfy one or more of the following conditional expressions.

$$3 < SK/Im < 6 \tag{4}$$

$$0.04 \text{ (rad/mm)} < |\alpha'IS - \alpha IS|/Im < 0.14 \text{ (rad/mm)} \tag{5}$$

The conditional expression (4) defines a relationship between the image size Im of the image pickup element and the equivalent length in air SK of the distance between the image plane and the lens surface on the most image side of the lenses constituting the third lens subunit R3.

When SK/Im is equal to or larger than the upper limit of the conditional expression (4), the total lens length is increased. On the contrary, SK/Im is equal to or smaller than the lower limit value of the conditional expression (4), a back focus necessary for inserting a color separation optical system or a filter such as an IR cut filter becomes short, which is not preferred.

The zoom lens having the image stabilizing function according to each embodiment appropriately sets the refractive power arrangement of the entire system, the definition of the moving lens unit for magnification-varying, and the structure of the second lens subunit R2 for image stabilizing and lens units disposed in front side or rear side of the second lens subunit R2. Thus, the size and weight of the second lens subunit R2 for image stabilizing is reduced, while the focus variation generated by decentering drive of the second lens subunit R2 is reduced, and further good optical performance is maintained during image stabilizing.

In addition, this embodiment adopts the following structure so that good optical performance is maintained during decentering.

In each embodiment, the optical axis movement amount when the second lens subunit R2 for image stabilizing is decentered is set to a sufficiently large value so that the decentering amount necessary for correcting image blur is reduced. Thus, the second lens subunit R2 is reduced in size.

Here, the decentering amount EIS of the second lens subunit R2 necessary for obtaining a predetermined image blur correction amount $\Delta Y$ on the image plane is expressed by the following expression from the expression (b) where R=0, $\omega$=0, and $\alpha k'$=1.

$$EIS = -\Delta Y / \{2(\Delta E)\} \tag{o}$$

Because the first-order origin movement ($\Delta E$) is expressed by the expression (h), the decentering amount EIS necessary for obtaining the necessary image blur correction amount $\Delta Y$ is defined by the incident conversion angle of inclination $\alpha$IS and the exit converted inclination angle $\alpha$'IS of the axial marginal beam with respect to the second lens subunit R2 for image stabilizing.

In the zoom lens of each embodiment, the incident conversion angle of inclination to the lens surface on the most object side of the lenses constituting the second lens subunit R2 is denoted by $\alpha$IS, the exit converted inclination angle from the lens surface on the most image side of the lenses constituting the second lens subunit R2 is denoted by $\alpha$'IS, and an image circle of the image pickup element is denoted by Im. In this case, it is preferred to satisfy the conditional expression (5).

When $|\alpha'IS-\alpha IS|/Im$ is equal to or larger than the upper limit value of the conditional expression (5), it becomes difficult to correct the decentering coma, the field curvature, or the lateral chromatic aberration generated when the second lens subunit R2 is decentered, which is not preferred. On the contrary, when $|\alpha'IS-\alpha IS|/Im$ is equal to or smaller than the lower limit value of the conditional expression (5), the decentering amount EIS increases so that the movement amount of the second lens subunit R2 is rapidly increased. In addition, an effective diameter of the second lens subunit R2 is increased when the decentering is taken into account. Therefore, necessary driving force is rapidly increased, and the size of the entire mechanism is increased. In addition, the generation of the decentering aberration is also increased due to the increase of the decentering amount EIS, which is not preferred for optical performance of the second lens subunit R2, too.

Concerning the conditional expression (2) described above, it is more preferred to satisfy the following expression, which is obtained by normalizing the conditional expression (2) by the conditional expression (5).

$$d \text{ave}/(|\alpha'IS-\alpha IS|/Im) < 68 \tag{11}$$

In each embodiment, it is more preferred that the numerical value ranges of the conditional expressions (4), (5) and (11) be set as follows.

$$4.0 < SK/Im < 5.5 \tag{4a}$$

$$0.05 \text{ (rad/mm)} < |\alpha'IS-\alpha IS|/Im < 0.13 \text{ (rad/mm)} \tag{5a}$$

$$20 < d\text{ave}/(|\alpha'IS-\alpha IS|/Im) < 67 \tag{11a}$$

The zoom lens of each embodiment has the function of shifting the focal length of the entire lens system to the telephoto side or to the wide-angle side by a method of unit interchanging or the like using the built-in extender or the like.

In this case, the lens unit that is interchanged with the extender is the first lens sub-subunit R3a, which is a part of the third lens subunit R3 and is disposed on the image side of the second lens subunit R2 for image stabilizing. With this structure, the arrangement on the object side of the second lens subunit R2 is not changed between before and after interchanging the structure of the first lens sub-subunit R3a. Therefore, the decentering amount of the second lens subunit R2 for obtaining a predetermined correction angle is not changed, and hence it is not necessary to change the control of the forth lens second unit R2 for image stabilizing, which is preferred.

If there is provided an optical path splitting element PR that guides the incident light to an automatic focus detection system or the like for an additional function such as automatic focus function, it is preferred to insert the optical path splitting element PR between the second lens subunit R2 and the third lens subunit R3 as illustrated in FIG. 18. By inserting the optical path splitting element on the image side of the second lens subunit R2, the additional function such as automatic focus function can be added without changing the control of the second lens subunit R2 for image stabilizing. Further, by disposing the optical path splitting element on the object side of the third lens subunit R3 to provide a focal length conversion effect or the like to the first lens sub-subunit R3a, an additional function such as automatic focus function can be obtained similarly.

Hereinafter, the features of lens structures of Numerical Embodiments 1 to 4 of the zoom lens having the image stabilizing function of the present invention are described.

In Numerical Embodiment 1, the first lens subunit R1 is formed of a single positive lens and a single negative lens. In addition, the second lens subunit R2 is formed of a single positive lens and two negative lenses.

In Numerical Embodiment 1, values of the conditional expressions (1) to (4) are the values shown in Table 1, all of which satisfy the ranges of the conditional expressions. In addition, the lateral magnification of the second lens subunit R2 is −1.08, and the focus movement amount of the e-line when the second lens subunit R2 is moved in the optical axis direction by 0.1 mm is 0.003 mm. Thus, the focus sensitivity is appropriate.

Table 2 shows the paraxial tracking value and aberration coefficients concerning the second lens subunit R2 and the third lens subunit R3, and the decentering aberration coefficients of the second lens subunit R2. It is understood from Table 2 that the decentering aberration coefficients of the second lens subunit R2 are appropriately set by controlling the paraxial amounts and the aberration coefficients of the second lens subunit R2 and the third lens subunit R3. In this way, by appropriately setting the paraxial amount of the second lens subunit R2 for image stabilizing, and sharing values of the aberration coefficients of the second lens subunit R2 and the third lens subunit R3 on the image side thereof, each decentering aberration coefficient of the second lens subunit R2 is set to a very small value.

The zoom ratio of the zoom lens of this numerical embodiment is 100, which is applied to a zoom lens that is required to have a large zoom ratio, so that the image blur is appropriately corrected with respect to the vibration.

As described above, in this numerical embodiment, the refractive power arrangement of the lens units of the entire system, the arrangement of the moving lens unit for magnification-varying, and the arrangement of the second lens subunit R2 for image stabilizing in the fourth lens unit R are appropriately set to maintain high optical performance in the entire zoom range including in the image stabilizing.

Here, the effective diameter of the second lens subunit R2 is set to a value of the sum of the decentering amount of the second lens subunit R2 when the second lens subunit R2 moves in the direction perpendicular to the optical axis by 1.5 mm for image stabilizing and the effective diameter when the image stabilizing is not performed.

The incident conversion angle of inclination and the exit converted inclination angle with respect to the second lens subunit R2 in this numerical embodiment are $\alpha 42'=-0.4170$ and $\alpha 42=0.4532$. Therefore, by decentering in the direction perpendicular to the optical axis by 1 mm, the image can be moved by 0.87 mm. Therefore, the decentering amount of the second lens subunit R2 for moving in the direction perpendicular to the optical axis by 1.5 mm for image stabilizing is determined to be 1.72 mm. Therefore, the effective diameter in this numerical embodiment is determined to be a value of the sum of the original effective diameter and 3.4 mm. As for each numerical embodiment after Numerical Embodiment 1, the effective diameter of the second lens subunit R2 for image stabilizing is determined by a similar concept.

Numerical Embodiment 2 has the same lens structure as Numerical Embodiment 1, in which sensitivity of the image blur correction when the second lens subunit R2 for image stabilizing is shifted is set to 0.65 mm per 1 mm shift. In addition, the lateral magnification of the second lens subunit R2 is −10, and the focus movement amount of the e-line when the second lens subunit R2 is moved in the optical axis direction by 0.1 mm is 0.06 mm. Therefore, it is understood that the focus sensitivity is reduced appropriately. It is understood from Tables 1 and that Numerical Embodiment 2 satisfies the conditional expressions (1) to (4), and generation amounts of various aberrations in decentering are suppressed appropriately.

Numerical Embodiment 3 has the same lens structure as Numerical Embodiment 1, in which the sensitivity of the image blur correction when the second lens subunit R2 for image stabilizing is shifted is set to 1.20 mm per 1 mm shift. In addition, the lateral magnification of the second lens subunit R2 is −0.7, and the focus movement amount of the e-line when the second lens subunit R2 is moved in the optical axis direction by 0.1 mm is 0.025 mm. Therefore, it is understood that the focus sensitivity is reduced appropriately. It is understood from Tables 1 and 2 that Numerical Embodiment 3 satisfies the conditional expressions (1) to (4), and generation amounts of various aberrations in decentering are suppressed appropriately.

Numerical Embodiment 4 has the same lens structure as Numerical Embodiment 1, in which the sensitivity of the image blur correction when the second lens subunit R2 for image stabilizing is shifted is set to 0.85 mm per 1 mm shift. In addition, the lateral magnification of the second lens subunit R2 is −0.7, and the focus movement amount of the e-line when the second lens subunit R2 is moved in the optical axis direction by 0.1 mm is 0.035 mm. Therefore, it is understood that the focus sensitivity is reduced appropriately. It is understood from Tables 1 and 2 that Numerical Embodiment 4 satisfies the conditional expressions (1) to (4), and generation amounts of various aberrations in decentering are suppressed appropriately.

The exemplary embodiments of the present invention are described above, but the present invention is not limited to those embodiments, which can be modified and changed variously within the range of the spirit thereof.

Hereinafter, Numerical Embodiments 1 to 4 respectively corresponding to the first to fourth embodiments of the present invention are described. In Numerical Embodiments, a surface number "i" is counted from the object side. In addition, ri indicates a curvature radius of an i-th surface counted from the object side, and di indicates an interval between the i-th surface and an (i+1)-th surface which are counted from the object side. Further, ndi and vdi indicate a refractive index and an Abbe number of an i-th optical material, respectively. θgF indicates a partial dispersion ratio. The last three surfaces indicate a glass block such as a filter. The values of the focal length, the F-number, and the angle of field are values when an object at infinity is focused. BF indicates a value of equivalent length in air of the distance between the last lens surface and the image plane.

Note that, the aspherical shape is expressed by the following expression in which x is the coordinate in the optical axis direction, y is the coordinate in the direction perpendicular to the optical axis, R is a standard curvature radius, k is the conic constant, and An is the n-th order aspheric coefficient. Here, "e-x" means "$\times 10^{-x}$". Note that, an aspheric lens surface marked with * on the left side on its surface number in each Table.

$$x=(y^2/r)/\{1+(1-k\cdot y^2/r^2)^{0.5}\}+A2\cdot y^2+A3\cdot y^3+A4\cdot y^4+A5\cdot y^5+A6\cdot y^6+A7\cdot y^7+A8\cdot y^8$$

Numerical Embodiments of the extender part are shown from the lens surface just before the object side to which the extender part is inserted (lens surface on the most image side in the second lens subunit R2, which is, for example, R36 in Numerical Embodiment 1). In addition, Table 1 shows values corresponding to the conditional expressions in Numerical Embodiments 1 to 4.

Numerical Embodiment 1

| Surface No. | r | d | nd | vd | θgF | Effective diameter | Focal length | density |
|---|---|---|---|---|---|---|---|---|
| 1 | 7000.000 | 6.00 | 1.8340 | 37.16 | 0.5775 | 195.689 | −433.032 | 4.43 |
| 2 | 345.379 | 2.00 | 1.0000 | 0.00 | 0.0000 | 189.566 | 0.000 | |
| 3 | 345.379 | 25.91 | 1.4339 | 95.10 | 0.5373 | 190.611 | 484.173 | 3.18 |
| 4 | −527.375 | 20.74 | 1.0000 | 0.00 | 0.0000 | 191.160 | 0.000 | |
| 5 | 331.921 | 18.73 | 1.4339 | 95.10 | 0.5373 | 193.336 | 706.637 | 3.18 |
| 6 | −4082.422 | 0.25 | 1.0000 | 0.00 | 0.0000 | 192.860 | 0.000 | |

-continued

| | | | | | | | | |
|---|---|---|---|---|---|---|---|---|
| 7 | 264.903 | 19.29 | 1.4339 | 95.10 | 0.5373 | 188.456 | 652.508 | 3.18 |
| 8 | 3887.712 | 0.25 | 1.0000 | 0.00 | 0.0000 | 187.250 | 0.000 | |
| 9 | 171.964 | 16.12 | 1.4388 | 94.93 | 0.5343 | 174.675 | 716.251 | 3.62 |
| 10 | 367.798 | (Variable) | 1.0000 | 0.00 | 0.0000 | 172.795 | 0.000 | |
| 11 | 1547.347 | 2.00 | 2.0033 | 28.27 | 0.5980 | 42.775 | −44.235 | 5.23 |
| 12 | 43.466 | 8.24 | 1.0000 | 0.00 | 0.0000 | 37.794 | 0.000 | |
| 13 | −55.129 | 2.00 | 1.8830 | 40.76 | 0.5667 | 37.774 | −32.903 | 5.52 |
| 14 | 63.246 | 9.63 | 1.9229 | 18.90 | 0.6495 | 41.361 | 35.902 | 3.58 |
| 15 | −66.171 | 1.02 | 1.0000 | 0.00 | 0.0000 | 42.369 | 0.000 | |
| 16 | −59.413 | 2.00 | 1.7725 | 49.60 | 0.5521 | 42.433 | −74.892 | 4.23 |
| 17* | 2736.384 | (Variable) | 1.0000 | 0.00 | 0.0000 | 44.716 | 0.000 | |
| 18 | 108.766 | 12.13 | 1.5691 | 71.30 | 0.5451 | 81.406 | 185.041 | 4.48 |
| 19* | −3543.181 | 0.20 | 1.0000 | 0.00 | 0.0000 | 81.809 | 0.000 | |
| 20 | 100.674 | 13.34 | 1.4970 | 81.54 | 0.5374 | 83.340 | 174.573 | 3.62 |
| 21 | −613.181 | 0.20 | 1.0000 | 0.00 | 0.0000 | 82.784 | 0.000 | |
| 22 | 103.700 | 2.50 | 1.8467 | 23.78 | 0.6205 | 79.373 | −171.938 | 3.54 |
| 23 | 60.132 | 20.33 | 1.4388 | 94.93 | 0.5343 | 74.975 | 113.871 | 3.62 |
| 24 | −268.844 | 0.20 | 1.0000 | 0.00 | 0.0000 | 73.524 | 0.000 | |
| 25* | 201.189 | 5.73 | 1.4388 | 94.93 | 0.5343 | 71.020 | 373.650 | 3.62 |
| 26 | −889.802 | (Variable) | 1.0000 | 0.00 | 0.0000 | 69.631 | 0.000 | |
| 27 (Stop) | 0.000 | 1.85 | 1.0000 | 0.00 | 0.0000 | 32.619 | 0.000 | |
| 28 | −174.745 | 1.40 | 1.8340 | 37.16 | 0.5775 | 31.922 | −28.930 | 4.43 |
| 29 | 28.304 | 5.27 | 1.8052 | 25.42 | 0.6161 | 30.374 | 42.521 | 3.37 |
| 30 | 143.407 | 2.67 | 1.0000 | 0.00 | 0.0000 | 30.012 | 0.000 | |
| 31 | 262.468 | 1.40 | 1.7725 | 49.60 | 0.5521 | 32.888 | −77.525 | 4.23 |
| 32 | 48.838 | 0.48 | 1.0000 | 0.00 | 0.0000 | 32.324 | 0.000 | |
| 33 | 30.142 | 4.35 | 1.7552 | 27.51 | 0.6103 | 32.665 | 57.946 | 3.15 |
| 34 | 89.135 | 3.08 | 1.0000 | 0.00 | 0.0000 | 32.015 | 0.000 | |
| 35 | −94.944 | 1.40 | 1.8160 | 46.62 | 0.5568 | 31.713 | −44.386 | 5.07 |
| 36 | 59.435 | 11.25 | 1.0000 | 0.00 | 0.0000 | 31.349 | 0.000 | |
| 37 | −36.670 | 1.70 | 1.8830 | 40.76 | 0.5667 | 29.469 | −50.777 | 5.52 |
| 38 | −200.503 | 7.27 | 1.5317 | 48.84 | 0.5630 | 31.687 | 87.783 | 2.50 |
| 39 | −38.491 | 2.00 | 1.0000 | 0.00 | 0.0000 | 34.132 | 0.000 | |
| 40 | 712.718 | 6.62 | 1.7725 | 49.60 | 0.5521 | 36.889 | 89.621 | 4.23 |
| 41 | −76.776 | 8.96 | 1.0000 | 0.00 | 0.0000 | 37.780 | 0.000 | |
| 42 | 439.858 | 5.87 | 1.5673 | 42.80 | 0.5730 | 37.813 | 143.391 | 2.57 |
| 43 | −100.000 | 2.00 | 1.0000 | 0.00 | 0.0000 | 37.705 | 0.000 | |
| 44 | 244.775 | 2.00 | 1.8830 | 40.76 | 0.5667 | 36.492 | −67.738 | 5.52 |
| 45 | 48.106 | 7.82 | 1.4875 | 70.23 | 0.5300 | 35.485 | 69.913 | 2.46 |
| 46 | −111.965 | 0.20 | 1.0000 | 0.00 | 0.0000 | 35.297 | 0.000 | |
| 47 | 47.273 | 9.43 | 1.4875 | 70.23 | 0.5300 | 34.088 | 50.034 | 2.46 |
| 48 | −47.423 | 2.00 | 1.8830 | 40.76 | 0.5667 | 32.688 | −38.982 | 5.52 |
| 49 | 130.802 | 0.70 | 1.0000 | 0.00 | 0.0000 | 31.756 | 0.000 | |
| 50 | 103.482 | 6.37 | 1.5163 | 64.14 | 0.5352 | 31.677 | 73.702 | 2.52 |
| 51 | −59.272 | 11.34 | 1.0000 | 0.00 | 0.0000 | 31.187 | 0.000 | |
| 52 | 0.000 | 33.00 | 1.6086 | 46.44 | 0.5664 | 60.000 | 0.000 | 3.32 |
| 53 | 0.000 | 13.20 | 1.5163 | 64.15 | 0.5352 | 60.000 | 0.000 | 2.52 |
| 54 | 0.000 | | | | | | | |

Aspherical surface data

Seventeenth surface

K = −2.53234e+004  A 4 = −4.13015e−007  A 6 = −2.14627e−010  A 8 = 2.26588e−013
Nineteenth surface K = 5.22565e+003  A 4 = 8.81676e−008  A 6 = 1.58180e−012  A 8 = 6.14872e−015
Twenty-fifth surface K = −9.48244e+000  A 4 = −7.57187e−007  A 6 = −1.54476e−010  A 8 = 2.42122e−014

Various data
Zoom ratio 100.00

| | Wide angle | Intermediate | Telephoto |
|---|---|---|---|
| Focal length | 9.30 | 94.44 | 930.00 |
| F-number | 1.85 | 1.85 | 4.90 |
| Angle of field | 30.60 | 3.33 | 0.34 |
| Image height | 5.50 | 5.50 | 5.50 |
| Total lens length | 628.02 | 628.02 | 628.02 |
| BF | 13.40 | 13.40 | 13.40 |
| d10 | 3.07 | 141.07 | 176.64 |
| d17 | 266.10 | 100.56 | 1.96 |
| d26 | 3.00 | 30.54 | 93.57 |
| d54 | 13.40 | 13.40 | 13.40 |
| Entrance pupil position | 124.58 | 996.17 | 11114.47 |
| Exit pupil position | 389.40 | 389.40 | 389.40 |

-continued

|  | | | |
|---|---|---|---|
| Front principal point position | 134.11 | 1114.33 | 14344.72 |
| Rear principal point position | 4.10 | −81.04 | −916.60 |

Zoom lens unit data

| Unit | Leading surface | Focal length | Lens structure length | Front principal point position | Rear principal point position |
|---|---|---|---|---|---|
| 1 | 1 | 238.05 | 109.29 | 59.18 | −20.74 |
| 2 | 11 | −25.00 | 24.89 | 4.19 | −12.46 |
| 3 | 18 | 66.50 | 54.63 | 13.57 | −26.05 |
| 4 | 27 | 51.44 | 153.64 | 59.73 | 18.78 |

(Extender portion) Magnification (2x)

| Surface No. | r | d | nd | vd | θgF | Effective diameter | Focal length | density |
|---|---|---|---|---|---|---|---|---|
| 36 | 59.435 | 4.65 | 1.0000 | 0.00 | 0.0000 | 31.349 | 0.000 | |
| 37 | 132.659 | 5.15 | 1.6400 | 60.08 | 0.5370 | 29.019 | 54.037 | 3.06 |
| 38 | −46.316 | 0.35 | 1.0000 | 0.00 | 0.0000 | 29.109 | 0.000 | |
| 39 | 23.481 | 6.41 | 1.7550 | 52.32 | 0.5476 | 26.654 | 26.874 | 4.40 |
| 40 | −136.295 | 1.20 | 1.8467 | 23.78 | 0.6205 | 25.549 | −22.803 | 3.54 |
| 41 | 22.844 | 6.20 | 1.0000 | 0.00 | 0.0000 | 22.143 | 0.000 | |
| 42 | 112.254 | 4.09 | 1.8467 | 23.78 | 0.6205 | 20.777 | 23.302 | 3.54 |
| 43 | −23.817 | 0.90 | 1.7550 | 52.32 | 0.5476 | 20.040 | −44.366 | 4.40 |
| 44 | −82.839 | 1.30 | 1.0000 | 0.00 | 0.0000 | 19.274 | 0.000 | |
| 45 | −35.373 | 1.20 | 1.8160 | 46.62 | 0.5568 | 18.889 | −24.500 | 5.07 |

Numerical Embodiment 2

| Surface No. | r | d | nd | vd | θgF | Effective diameter | Focal length | density |
|---|---|---|---|---|---|---|---|---|
| 1 | 7000.000 | 6.00 | 1.8340 | 37.16 | 0.5775 | 195.689 | −433.032 | 4.43 |
| 2 | 345.379 | 2.00 | 1.0000 | 0.00 | 0.0000 | 189.566 | 0.000 | |
| 3 | 345.379 | 25.91 | 1.4339 | 95.10 | 0.5373 | 190.611 | 484.173 | 3.18 |
| 4 | −527.375 | 20.74 | 1.0000 | 0.00 | 0.0000 | 191.160 | 0.000 | |
| 5 | 331.921 | 18.73 | 1.4339 | 95.10 | 0.5373 | 193.336 | 706.637 | 3.18 |
| 6 | −4082.422 | 0.25 | 1.0000 | 0.00 | 0.0000 | 192.860 | 0.000 | |
| 7 | 264.903 | 19.29 | 1.4339 | 95.10 | 0.5373 | 188.456 | 652.508 | 3.18 |
| 8 | 3887.712 | 0.25 | 1.0000 | 0.00 | 0.0000 | 187.250 | 0.000 | |
| 9 | 171.964 | 16.12 | 1.4388 | 94.93 | 0.5343 | 174.675 | 716.251 | 3.62 |
| 10 | 367.798 | (Variable) | 1.0000 | 0.00 | 0.0000 | 172.795 | 0.000 | |
| 11 | 1547.347 | 2.00 | 2.0033 | 28.27 | 0.5980 | 42.775 | −44.235 | 5.23 |
| 12 | 43.466 | 8.24 | 1.0000 | 0.00 | 0.0000 | 37.794 | 0.000 | |
| 13 | −55.129 | 2.00 | 1.8830 | 40.76 | 0.5667 | 37.774 | −32.903 | 5.52 |
| 14 | 63.246 | 9.63 | 1.9229 | 18.90 | 0.6495 | 41.361 | 35.902 | 3.58 |
| 15 | −66.171 | 1.02 | 1.0000 | 0.00 | 0.0000 | 42.369 | 0.000 | |
| 16 | −59.413 | 2.00 | 1.7725 | 49.60 | 0.5521 | 42.433 | −74.892 | 4.23 |
| 17* | 2736.384 | (Variable) | 1.0000 | 0.00 | 0.0000 | 44.716 | 0.000 | |
| 18 | 108.766 | 12.13 | 1.5691 | 71.30 | 0.5451 | 81.406 | 185.041 | 4.48 |
| 19* | −3543.181 | 0.20 | 1.0000 | 0.00 | 0.0000 | 81.809 | 0.000 | |
| 20 | 100.674 | 13.34 | 1.4970 | 81.54 | 0.5374 | 83.340 | 174.573 | 3.62 |
| 21 | −613.181 | 0.20 | 1.0000 | 0.00 | 0.0000 | 82.784 | 0.000 | |
| 22 | 103.700 | 2.50 | 1.8467 | 23.78 | 0.6205 | 79.373 | −171.938 | 3.54 |
| 23 | 60.132 | 20.33 | 1.4388 | 94.93 | 0.5343 | 74.975 | 113.871 | 3.62 |
| 24 | −268.844 | 0.20 | 1.0000 | 0.00 | 0.0000 | 73.524 | 0.000 | |
| 25* | 201.189 | 5.73 | 1.4388 | 94.93 | 0.5343 | 71.020 | 373.650 | 3.62 |
| 26 | −889.802 | (Variable) | 1.0000 | 0.00 | 0.0000 | 69.631 | 0.000 | |
| 27 (Stop) | 0.000 | 1.34 | 1.0000 | 0.00 | 0.0000 | 32.619 | 0.000 | |
| 28 | −646.478 | 1.40 | 1.8340 | 37.16 | 0.5775 | 31.910 | −27.196 | 4.43 |
| 29 | 23.685 | 6.06 | 1.8052 | 25.42 | 0.6161 | 29.833 | 35.274 | 3.37 |
| 30 | 120.696 | 4.92 | 1.0000 | 0.00 | 0.0000 | 29.359 | 0.000 | |
| 31 | −79.499 | 1.40 | 1.8160 | 46.62 | 0.5568 | 33.114 | −37.578 | 5.07 |
| 32 | 50.732 | 1.03 | 1.0000 | 0.00 | 0.0000 | 33.091 | 0.000 | |
| 33 | 44.986 | 4.35 | 1.7847 | 26.29 | 0.6135 | 33.811 | 71.673 | 3.30 |
| 34 | 207.797 | 10.59 | 1.0000 | 0.00 | 0.0000 | 33.709 | 0.000 | |
| 35 | −26.332 | 1.70 | 1.8830 | 40.76 | 0.5667 | 29.291 | −40.084 | 5.52 |
| 36 | −104.210 | 7.17 | 1.5317 | 48.84 | 0.5630 | 32.306 | 73.031 | 2.50 |
| 37 | −29.071 | 2.00 | 1.0000 | 0.00 | 0.0000 | 34.270 | 0.000 | |

-continued

| | | | | | | | | |
|---|---|---|---|---|---|---|---|---|
| 38 | −196.429 | 5.79 | 1.7725 | 49.60 | 0.5521 | 36.488 | 128.206 | 4.23 |
| 39 | −66.902 | 8.88 | 1.0000 | 0.00 | 0.0000 | 37.542 | 0.000 | |
| 40 | 523.065 | 5.26 | 1.5673 | 42.80 | 0.5730 | 37.836 | 147.613 | 2.57 |
| 41 | −100.000 | 2.00 | 1.0000 | 0.00 | 0.0000 | 37.804 | 0.000 | |
| 42 | 212.296 | 2.00 | 1.8830 | 40.76 | 0.5667 | 36.697 | −56.917 | 5.52 |
| 43 | 40.648 | 8.82 | 1.4875 | 70.23 | 0.5300 | 35.588 | 59.147 | 2.46 |
| 44 | −93.217 | 0.20 | 1.0000 | 0.00 | 0.0000 | 35.560 | 0.000 | |
| 45 | 70.188 | 8.61 | 1.4875 | 70.23 | 0.5300 | 34.713 | 58.004 | 2.46 |
| 46 | −45.704 | 2.00 | 1.8830 | 40.76 | 0.5667 | 33.732 | −47.851 | 5.52 |
| 47 | 618.524 | 0.70 | 1.0000 | 0.00 | 0.0000 | 33.385 | 0.000 | |
| 48 | 226.224 | 6.52 | 1.5163 | 64.14 | 0.5352 | 33.307 | 78.667 | 2.52 |
| 49 | −49.243 | 11.34 | 1.0000 | 0.00 | 0.0000 | 33.008 | 0.000 | |
| 50 | 0.000 | 33.00 | 1.6086 | 46.44 | 0.5664 | 60.000 | 0.000 | 3.32 |
| 51 | 0.000 | 13.20 | 1.5163 | 64.15 | 0.5352 | 60.000 | 0.000 | 2.52 |
| 52 | 0.000 | | | | | | | |

Aspherical surface data

Seventeenth surface $K = -2.53234e+004$  $A\,4 = -4.13015e-007$  $A\,6 = -2.14627e-010$  $A\,8 = 2.26588e-013$
Nineteenth surface $K = 5.22565e+003$  $A\,4 = 8.81676e-008$  $A\,6 = 1.58180e-012$  $A\,8 = 6.14872e-015$
Twenty-fifth surface $K = -9.48244e+000$  $A\,4 = -7.57187e-007$  $A\,6 = -1.54476e-010$  $A\,8 = 2.42122e-014$ Various data
Zoom ratio 100.00

| | Wide angle | Intermediate | Telephoto |
|---|---|---|---|
| Focal length | 9.30 | 94.44 | 930.00 |
| F-number | 1.85 | 1.85 | 4.90 |
| Angle of field | 30.60 | 3.33 | 0.34 |
| Image height | 5.50 | 5.50 | 5.50 |
| Total lens length | 627.15 | 627.15 | 627.15 |
| BF | 15.88 | 15.88 | 15.88 |
| d10 | 3.07 | 141.07 | 176.64 |
| d17 | 266.10 | 100.56 | 1.96 |
| d26 | 3.00 | 30.54 | 93.57 |
| d52 | 15.88 | 15.88 | 15.88 |
| Entrance pupil position | 124.58 | 996.17 | 11114.47 |
| Exit pupil position | 467.40 | 467.40 | 467.40 |
| Front principal point position | 134.07 | 1110.37 | 13960.04 |
| Rear principal point position | 6.58 | −78.56 | −914.12 |

Zoom lens unit data

| Unit | Leading surface | Focal length | Lens structure length | Front principal point position | Rear principal point position |
|---|---|---|---|---|---|
| 1 | 1 | 238.05 | 109.29 | 59.18 | −20.74 |
| 2 | 11 | −25.00 | 24.89 | 4.19 | −12.46 |
| 3 | 18 | 66.50 | 54.63 | 13.57 | −26.05 |
| 4 | 27 | 52.78 | 150.28 | 59.86 | 21.40 |

(Extender portion)
Magnification (2x)

| Surface No. | r | d | nd | vd | θgF | Effective diameter | Focal length | density |
|---|---|---|---|---|---|---|---|---|
| 34 | 207.797 | 4.00 | 1.0000 | 0.00 | 0.0000 | 31.020 | 0.000 | |
| 35 | 735.268 | 4.02 | 1.5638 | 60.67 | 0.5402 | 29.220 | 94.875 | 2.78 |
| 36 | −57.822 | 0.30 | 1.0000 | 0.00 | 0.0000 | 29.237 | 0.000 | |
| 37 | 23.309 | 7.41 | 1.7550 | 52.32 | 0.5476 | 27.317 | 25.617 | 4.40 |
| 38 | −100.711 | 1.20 | 1.8467 | 23.78 | 0.6205 | 25.689 | −23.045 | 3.54 |
| 39 | 24.632 | 6.26 | 1.0000 | 0.00 | 0.0000 | 22.431 | 0.000 | |
| 40 | 97.049 | 3.48 | 1.8467 | 23.78 | 0.6205 | 20.683 | 27.833 | 3.54 |
| 41 | −31.008 | 0.90 | 1.7550 | 52.32 | 0.5476 | 20.283 | −49.249 | 4.40 |
| 42 | −184.864 | 0.99 | 1.0000 | 0.00 | 0.0000 | 19.368 | 0.000 | |
| 43 | −53.838 | 1.20 | 1.7550 | 52.32 | 0.5476 | 19.045 | −25.465 | 4.40 |
| 44 | 30.407 | 6.36 | 1.0000 | 0.00 | 0.0000 | 18.136 | 0.000 | |

Numerical Embodiment 3

| Surface No. | r | d | nd | vd | θgF | Effective diameter | Focal length | density |
|---|---|---|---|---|---|---|---|---|
| 1 | 7000.000 | 6.00 | 1.8340 | 37.16 | 0.5775 | 195.689 | −433.032 | 4.43 |
| 2 | 345.379 | 2.00 | 1.0000 | 0.00 | 0.0000 | 189.566 | 0.000 | |
| 3 | 345.379 | 25.91 | 1.4339 | 95.10 | 0.5373 | 190.611 | 484.173 | 3.18 |
| 4 | −527.375 | 20.74 | 1.0000 | 0.00 | 0.0000 | 191.160 | 0.000 | |
| 5 | 331.921 | 18.73 | 1.4339 | 95.10 | 0.5373 | 193.336 | 706.637 | 3.18 |
| 6 | −4082.422 | 0.25 | 1.0000 | 0.00 | 0.0000 | 192.860 | 0.000 | |
| 7 | 264.903 | 19.29 | 1.4339 | 95.10 | 0.5373 | 188.456 | 652.508 | 3.18 |
| 8 | 3887.712 | 0.25 | 1.0000 | 0.00 | 0.0000 | 187.250 | 0.000 | |
| 9 | 171.964 | 16.12 | 1.4388 | 94.93 | 0.5343 | 174.675 | 716.251 | 3.62 |
| 10 | 367.798 | (Variable) | 1.0000 | 0.00 | 0.0000 | 172.795 | 0.000 | |
| 11 | 1547.347 | 2.00 | 2.0033 | 28.27 | 0.5980 | 42.775 | −44.235 | 5.23 |
| 12 | 43.466 | 8.24 | 1.0000 | 0.00 | 0.0000 | 37.794 | 0.000 | |
| 13 | −55.129 | 2.00 | 1.8830 | 40.76 | 0.5667 | 37.774 | −32.903 | 5.52 |
| 14 | 63.246 | 9.63 | 1.9229 | 18.90 | 0.6495 | 41.361 | 35.902 | 3.58 |
| 15 | −66.171 | 1.02 | 1.0000 | 0.00 | 0.0000 | 42.369 | 0.000 | |
| 16 | −59.413 | 2.00 | 1.7725 | 49.60 | 0.5521 | 42.433 | −74.892 | 4.23 |
| 17* | 2736.384 | (Variable) | 1.0000 | 0.00 | 0.0000 | 44.716 | 0.000 | |
| 18 | 108.766 | 12.13 | 1.5691 | 71.30 | 0.5451 | 81.406 | 185.041 | 4.48 |
| 19* | −3543.181 | 0.20 | 1.0000 | 0.00 | 0.0000 | 81.809 | 0.000 | |
| 20 | 100.674 | 13.34 | 1.4970 | 81.54 | 0.5374 | 83.340 | 174.573 | 3.62 |
| 21 | −613.181 | 0.20 | 1.0000 | 0.00 | 0.0000 | 82.784 | 0.000 | |
| 22 | 103.700 | 2.50 | 1.8467 | 23.78 | 0.6205 | 79.373 | −171.938 | 3.54 |
| 23 | 60.132 | 20.33 | 1.4388 | 94.93 | 0.5343 | 74.975 | 113.871 | 3.62 |
| 24 | −268.844 | 0.20 | 1.0000 | 0.00 | 0.0000 | 73.524 | 0.000 | |
| 25* | 201.189 | 5.73 | 1.4388 | 94.93 | 0.5343 | 71.020 | 373.650 | 3.62 |
| 26 | −889.802 | (Variable) | 1.0000 | 0.00 | 0.0000 | 69.631 | 0.000 | |
| 27 (Stop) | 0.000 | 1.75 | 1.0000 | 0.00 | 0.0000 | 32.619 | 0.000 | |
| 28 | −214.365 | 1.40 | 1.8830 | 40.76 | 0.5667 | 31.906 | −43.411 | 5.52 |
| 29 | 47.155 | 3.55 | 1.8052 | 25.42 | 0.6161 | 30.796 | 79.741 | 3.37 |
| 30 | 167.322 | 3.23 | 1.0000 | 0.00 | 0.0000 | 30.424 | 0.000 | |
| 31 | −1150.349 | 1.40 | 1.7725 | 49.60 | 0.5521 | 32.319 | −57.535 | 4.23 |
| 32 | 46.487 | 0.49 | 1.0000 | 0.00 | 0.0000 | 31.806 | 0.000 | |
| 33 | 31.688 | 4.35 | 1.8467 | 23.78 | 0.6205 | 32.338 | 59.741 | 3.54 |
| 34 | 78.183 | 3.59 | 1.0000 | 0.00 | 0.0000 | 31.670 | 0.000 | |
| 35 | −73.887 | 1.40 | 1.7880 | 47.37 | 0.5559 | 31.466 | −43.753 | 4.30 |
| 36 | 65.798 | 9.71 | 1.0000 | 0.00 | 0.0000 | 31.528 | 0.000 | |
| 37 | 65.067 | 5.56 | 1.7550 | 52.32 | 0.5476 | 33.083 | 52.205 | 4.40 |
| 38 | −97.409 | 4.78 | 1.0000 | 0.00 | 0.0000 | 33.066 | 0.000 | |
| 39 | −31.440 | 2.00 | 1.8830 | 40.76 | 0.5667 | 32.602 | −32.129 | 5.52 |
| 40 | 318.061 | 12.81 | 1.5481 | 45.79 | 0.5685 | 35.507 | 50.920 | 2.54 |
| 41 | −30.330 | 4.69 | 1.0000 | 0.00 | 0.0000 | 38.424 | 0.000 | |
| 42 | −388.000 | 5.42 | 1.5927 | 35.31 | 0.5933 | 38.258 | 130.045 | 2.64 |
| 43 | −65.000 | 2.00 | 1.0000 | 0.00 | 0.0000 | 38.341 | 0.000 | |
| 44 | −259.585 | 2.00 | 1.8830 | 40.76 | 0.5667 | 36.912 | −57.211 | 5.52 |
| 45 | 63.408 | 8.37 | 1.4875 | 70.23 | 0.5300 | 36.335 | 65.956 | 2.46 |
| 46 | −62.834 | 0.20 | 1.0000 | 0.00 | 0.0000 | 36.400 | 0.000 | |
| 47 | 51.878 | 9.69 | 1.4875 | 70.23 | 0.5300 | 34.798 | 49.495 | 2.46 |
| 48 | −42.611 | 2.00 | 1.8830 | 40.76 | 0.5667 | 33.451 | −42.087 | 5.52 |
| 49 | 311.150 | 0.70 | 1.0000 | 0.00 | 0.0000 | 32.711 | 0.000 | |
| 50 | 50.825 | 6.08 | 1.5163 | 64.14 | 0.5352 | 32.289 | 83.321 | 2.52 |
| 51 | −275.401 | 11.34 | 1.0000 | 0.00 | 0.0000 | 31.327 | 0.000 | |
| 52 | 0.000 | 33.00 | 1.6086 | 46.44 | 0.5664 | 60.000 | 0.000 | 3.32 |
| 53 | 0.000 | 13.20 | 1.5163 | 64.15 | 0.5352 | 60.000 | 0.000 | 2.52 |
| 54 | 0.000 | | | | | | | |

Aspherical surface data

Seventeenth surface

K = −2.53234e+004   A 4 = −4.13015e−007   A 6 = −2.14627e−010   A 8 = 2.26588e−013

Nineteenth surface

K = 5.22565e+003   A 4 = 8.81676e−008   A 6 = 1.58180e−012   A 8 = 6.14872e−015

Twenty-fifth surface

K = −9.48244e+000   A 4 = −7.57187e−007   A 6 = −1.54476e−010   A 8 = 2.42122e−014

Various data
Zoom ratio 100.00

| | Wide angle | Intermediate | Telephoto |
|---|---|---|---|
| Focal length | 9.30 | 94.44 | 930.00 |
| F-number | 1.85 | 1.85 | 4.90 |

|  |  |  |  |
|---|---|---|---|
| Angle of field | 30.60 | 3.33 | 0.34 |
| Image height | 5.50 | 5.50 | 5.50 |
| Total lens length | 631.01 | 631.01 | 631.01 |
| BF | 15.31 | 15.31 | 15.31 |
| d10 | 3.07 | 141.07 | 176.64 |
| d17 | 266.10 | 100.56 | 1.96 |
| d26 | 3.00 | 30.54 | 93.57 |
| d54 | 15.31 | 15.31 | 15.31 |
| Entrance pupil position | 124.58 | 996.17 | 11114.47 |
| Exit pupil position | 387.47 | 387.47 | 387.47 |
| Front principal point position | 134.11 | 1114.58 | 14368.47 |
| Rear principal point position | 6.01 | −79.13 | −914.69 |

Zoom lens unit data

| Unit | Leading surface | Focal length | Lens structure length | Front principal point position | Rear principal point position |
|---|---|---|---|---|---|
| 1 | 1 | 238.05 | 109.29 | 59.18 | −20.74 |
| 2 | 11 | −25.00 | 24.89 | 4.19 | −12.46 |
| 3 | 18 | 66.50 | 54.63 | 13.57 | −26.05 |
| 4 | 27 | 51.36 | 154.72 | 59.72 | 20.68 |

(Extender portion)

| Surface No. | r | d | nd | vd | θgF | Effective diameter | Focal length | density |
|---|---|---|---|---|---|---|---|---|
| 36 | 65.798 | 4.6 | 1.0000 | 0.00 | 0.0000 | 31.528 | 0.000 |  |
| 37 | 82.040 | 5.40 | 1.8160 | 46.62 | 0.5568 | 30.819 | 44.573 | 5.07 |
| 38 | −63.986 | 0.45 | 1.0000 | 0.00 | 0.0000 | 30.881 | 0.000 |  |
| 39 | 27.419 | 8.73 | 1.7550 | 52.32 | 0.5476 | 28.648 | 28.665 | 4.40 |
| 40 | −90.547 | 0.80 | 1.8467 | 23.78 | 0.6205 | 26.569 | −26.153 | 3.54 |
| 41 | 29.817 | 8.38 | 1.0000 | 0.00 | 0.0000 | 23.867 | 0.000 |  |
| 42 | 118.566 | 0.80 | 1.8830 | 40.76 | 0.5667 | 20.299 | −77.000 | 5.52 |
| 43 | 43.233 | 2.64 | 1.8081 | 22.76 | 0.6307 | 19.759 | 41.130 | 3.29 |
| 44 | −146.251 | 1.20 | 1.0000 | 0.00 | 0.0000 | 19.155 | 0.000 |  |
| 45 | −38.600 | 0.75 | 1.5638 | 60.67 | 0.5402 | 19.154 | −28.839 | 2.78 |
| 46 | 28.487 | 5.74 | 1.0000 | 0.00 | 0.0000 | 18.368 | 0.000 |  |

Numerical Embodiment 4

| Surface No. | r | d | nd | vd | θgF | Effective diameter | Focal length | density |
|---|---|---|---|---|---|---|---|---|
| 1 | 7000.000 | 6.00 | 1.8340 | 37.16 | 0.5775 | 195.689 | −433.032 | 4.43 |
| 2 | 345.379 | 2.00 | 1.0000 | 0.00 | 0.0000 | 189.566 | 0.000 |  |
| 3 | 345.379 | 25.91 | 1.4339 | 95.10 | 0.5373 | 190.611 | 484.173 | 3.18 |
| 4 | −527.375 | 20.74 | 1.0000 | 0.00 | 0.0000 | 191.160 | 0.000 |  |
| 5 | 331.921 | 18.73 | 1.4339 | 95.10 | 0.5373 | 193.336 | 706.637 | 3.18 |
| 6 | −4082.422 | 0.25 | 1.0000 | 0.00 | 0.0000 | 192.860 | 0.000 |  |
| 7 | 264.903 | 19.29 | 1.4339 | 95.10 | 0.5373 | 188.456 | 652.508 | 3.18 |
| 8 | 3887.712 | 0.25 | 1.0000 | 0.00 | 0.0000 | 187.250 | 0.000 |  |
| 9 | 171.964 | 16.12 | 1.4388 | 94.93 | 0.5343 | 174.675 | 716.251 | 3.62 |
| 10 | 367.798 | (Variable) | 1.0000 | 0.00 | 0.0000 | 172.795 | 0.000 |  |
| 11 | 1547.347 | 2.00 | 2.0033 | 28.27 | 0.5980 | 42.775 | −44.235 | 5.23 |
| 12 | 43.466 | 8.24 | 1.0000 | 0.00 | 0.0000 | 37.794 | 0.000 |  |
| 13 | −55.129 | 2.00 | 1.8830 | 40.76 | 0.5667 | 37.774 | −32.903 | 5.52 |
| 14 | 63.246 | 9.63 | 1.9229 | 18.90 | 0.6495 | 41.361 | 35.902 | 3.58 |
| 15 | −66.171 | 1.02 | 1.0000 | 0.00 | 0.0000 | 42.369 | 0.000 |  |
| 16 | −59.413 | 2.00 | 1.7725 | 49.60 | 0.5521 | 42.433 | −74.892 | 4.23 |
| 17* | 2736.384 | (Variable) | 1.0000 | 0.00 | 0.0000 | 44.716 | 0.000 |  |
| 18 | 108.766 | 12.13 | 1.5691 | 71.30 | 0.5451 | 81.406 | 185.041 | 4.48 |
| 19* | −3543.181 | 0.20 | 1.0000 | 0.00 | 0.0000 | 81.809 | 0.000 |  |
| 20 | 100.674 | 13.34 | 1.4970 | 81.54 | 0.5374 | 83.340 | 174.573 | 3.62 |
| 21 | −613.181 | 0.20 | 1.0000 | 0.00 | 0.0000 | 82.784 | 0.000 |  |
| 22 | 103.700 | 2.50 | 1.8467 | 23.78 | 0.6205 | 79.373 | −171.938 | 3.54 |
| 23 | 60.132 | 20.33 | 1.4388 | 94.93 | 0.5343 | 74.975 | 113.871 | 3.62 |
| 24 | −268.844 | 0.20 | 1.0000 | 0.00 | 0.0000 | 73.524 | 0.000 |  |
| 25* | 201.189 | 5.73 | 1.4388 | 94.93 | 0.5343 | 71.020 | 373.650 | 3.62 |

-continued

| | | | | | | | | |
|---|---|---|---|---|---|---|---|---|
| 26 | −889.802 | (Variable) | 1.0000 | 0.00 | 0.0000 | 69.631 | 0.000 | |
| 27 (Stop) | 0.000 | 1.19 | 1.0000 | 0.00 | 0.0000 | 32.619 | 0.000 | |
| 28 | −3489.250 | 1.40 | 1.8340 | 37.16 | 0.5775 | 31.908 | −49.068 | 4.43 |
| 29 | 41.684 | 3.44 | 1.8467 | 23.78 | 0.6205 | 30.516 | 80.535 | 3.54 |
| 30 | 101.600 | 3.36 | 1.0000 | 0.00 | 0.0000 | 29.977 | 0.000 | |
| 31 | 479.925 | 1.40 | 1.8160 | 46.62 | 0.5568 | 32.648 | −63.212 | 5.07 |
| 32 | 46.729 | 0.88 | 1.0000 | 0.00 | 0.0000 | 31.912 | 0.000 | |
| 33 | 33.483 | 4.35 | 1.8052 | 25.42 | 0.6161 | 32.147 | 60.079 | 3.37 |
| 34 | 100.354 | 3.19 | 1.0000 | 0.00 | 0.0000 | 31.412 | 0.000 | |
| 35 | −72.324 | 1.40 | 1.8160 | 46.62 | 0.5568 | 31.053 | −54.726 | 5.07 |
| 36 | 119.335 | 4.04 | 1.0000 | 0.00 | 0.0000 | 30.919 | 0.000 | |
| 37 | 0.000 | 20.70 | 1.8348 | 42.71 | 0.5642 | 35.000 | 0.000 | 4.73 |
| 38 | 0.000 | 7.19 | 1.0000 | 0.00 | 0.0000 | 35.000 | 0.000 | |
| 39 | −51.775 | 1.70 | 1.8830 | 40.76 | 0.5667 | 29.744 | −51.524 | 5.52 |
| 40 | 400.000 | 5.91 | 1.6477 | 33.79 | 0.5939 | 31.179 | 102.450 | 2.79 |
| 41 | −79.753 | 2.25 | 1.0000 | 0.00 | 0.0000 | 32.766 | 0.000 | |
| 42 | 211.478 | 9.75 | 1.7725 | 49.60 | 0.5521 | 34.614 | 91.944 | 4.23 |
| 43 | −105.549 | 9.61 | 1.0000 | 0.00 | 0.0000 | 35.715 | 0.000 | |
| 44 | 430.069 | 6.54 | 1.5481 | 45.79 | 0.5685 | 35.649 | 115.346 | 2.54 |
| 45 | −74.171 | 2.00 | 1.0000 | 0.00 | 0.0000 | 35.516 | 0.000 | |
| 46 | −3710.025 | 2.00 | 1.8830 | 40.76 | 0.5667 | 34.139 | −45.164 | 5.52 |
| 47 | 40.561 | 7.70 | 1.5182 | 58.90 | 0.5456 | 33.184 | 59.692 | 2.48 |
| 48 | −123.967 | 0.20 | 1.0000 | 0.00 | 0.0000 | 33.188 | 0.000 | |
| 49 | 53.986 | 10.60 | 1.5163 | 64.14 | 0.5352 | 33.031 | 46.500 | 2.52 |
| 50 | −40.612 | 2.00 | 1.8830 | 40.76 | 0.5667 | 32.163 | −43.053 | 5.52 |
| 51 | 668.833 | 0.70 | 1.0000 | 0.00 | 0.0000 | 32.293 | 0.000 | |
| 52 | 67.024 | 6.87 | 1.4875 | 70.23 | 0.5300 | 32.513 | 71.906 | 2.46 |
| 53 | −71.519 | 11.34 | 1.0000 | 0.00 | 0.0000 | 32.194 | 0.000 | |
| 54 | 0.000 | 33.00 | 1.6086 | 46.44 | 0.5664 | 60.000 | 0.000 | 3.32 |
| 55 | 0.000 | 13.20 | 1.5163 | 64.15 | 0.5352 | 60.000 | 0.000 | 2.52 |
| 56 | 0.000 | | | | | | | |

Aspherical surface data

Seventeenth surface $K = -2.53234e+004$  $A4 = -4.13015e-007$  $A6 = -2.14627e-010$  $A8 = 2.26588e-013$ Nineteenth surface $K = 5.22565e+003$  $A4 = 8.81676e-008$  $A6 = 1.58180e-012$  $A8 = 6.14872e-015$ Twenty-fifth surface $K = -9.48244e+000$  $A4 = -7.57187e-007$  $A6 = -1.54476e-010$  $A8 = 2.42122e-014$ Various data
Zoom ratio 100.00

| | Wide angle | Intermediate | Telephoto |
|---|---|---|---|
| Focal length | 9.30 | 94.44 | 930.00 |
| F-number | 1.85 | 1.85 | 4.90 |
| Angle of field | 30.60 | 3.33 | 0.34 |
| Image height | 5.50 | 5.50 | 5.50 |
| Total lens length | 650.25 | 650.25 | 650.25 |
| BF | 11.36 | 11.36 | 11.36 |
| d10 | 3.07 | 141.07 | 176.64 |
| d17 | 266.10 | 100.56 | 1.96 |
| d26 | 3.00 | 30.54 | 93.57 |
| d56 | 11.36 | 11.36 | 11.36 |
| Entrance pupil position | 124.58 | 996.17 | 11114.47 |
| Exit pupil position | 137.38 | 137.38 | 137.38 |
| Front principal point position | 134.56 | 1161.39 | 18907.54 |
| Rear principal point position | 2.06 | −83.08 | −918.64 |

Zoom lens unit data

| Unit | Leading surface | Focal length | Lens structure length | Front principal point position | Rear principal point position |
|---|---|---|---|---|---|
| 1 | 1 | 238.05 | 109.29 | 59.18 | −20.74 |
| 2 | 11 | −25.00 | 24.89 | 4.19 | −12.46 |
| 3 | 18 | 66.50 | 54.63 | 13.57 | −26.05 |
| 4 | 27 | 39.58 | 177.91 | 58.61 | 15.50 |

-continued (Extender portion)

| Surface No. | r | d | nd | νd | θgF | Effective diameter | Focal length | density |
|---|---|---|---|---|---|---|---|---|
| 38 | 0.000 | 2.32 | 1.0000 | 0.00 | 0.0000 | 35.000 | 0.000 | |
| 39 | 112.913 | 5.30 | 1.7550 | 52.32 | 0.5476 | 29.538 | 56.109 | 4.40 |
| 40 | −66.912 | 1.11 | 1.0000 | 0.00 | 0.0000 | 29.415 | 0.000 | |
| 41 | 24.275 | 6.43 | 1.7550 | 52.32 | 0.5476 | 26.464 | 26.485 | 4.40 |
| 42 | −103.133 | 0.90 | 1.8467 | 23.78 | 0.6205 | 25.092 | −23.072 | 3.54 |
| 43 | 24.492 | 6.98 | 1.0000 | 0.00 | 0.0000 | 21.997 | 0.000 | |
| 44 | 332.474 | 3.98 | 1.8467 | 23.78 | 0.6205 | 19.738 | 23.607 | 3.54 |
| 45 | −21.372 | 0.90 | 1.7550 | 52.32 | 0.5476 | 19.292 | −32.390 | 4.40 |
| 46 | −167.361 | 1.26 | 1.0000 | 0.00 | 0.0000 | 18.190 | 0.000 | |
| 47 | −38.167 | 0.70 | 1.6968 | 55.53 | 0.5433 | 17.837 | −25.422 | 3.70 |
| 48 | 33.572 | 6.54 | 1.0000 | 0.00 | 0.0000 | 17.213 | 0.000 | |

TABLE 1

| Conditional Expression | Meaning of expression | Numerical Embodiment 1 | Numerical Embodiment 2 | Numerical Embodiment 3 | Numerical Embodiment 4 |
|---|---|---|---|---|---|
| (1) | f41/f42 | 1.51 | 1.35 | 2.21 | 2.10 |
| (2) | dave | 4.65 | | 4.27 | 5.07 |
| | Number of concave lenses in the second lens subunit | 2 | 1 | 2 | 2 |
| (11) | Expression (2)/Expression (8) | 59 | | 39 | 66 |
| (3) | $|\nu d41p - \nu d41n|$ | 11.74 | 11.74 | 15.34 | 13.38 |
| (4) | SK/Im | 4.91 | 5.13 | 5.08 | 4.72 |
| (5) | $|\alpha42' - \alpha42|/Im$ | 0.08 | 0.06 | 0.11 | 0.08 |
| (6) | $|\nu d42p - \nu d42n|$ | 20.60 | 20.33 | 24.71 | 21.20 |
| (7) | $|\nu d43p - \nu d43n|$ | 16.88 | 16.88 | 15.58 | 16.88 |
| (8) | Z2max/Z2min | 15.57 | 15.57 | 15.57 | 15.57 |
| (9) | Z2max/(Z2min × Z) | 0.16 | 0.16 | 0.16 | 0.16 |
| (10) | β42 | −1.09 | −10.00 | −0.70 | −3.00 |
| | f41 | −86.72 | −108.46 | −93.67 | −120.79 |
| | f42 | −57.35 | −80.58 | −42.45 | −57.651 |
| | ν41p | 25.42 | 25.42 | 25.42 | 23.78 |
| | ν41n | 37.16 | 37.16 | 40.76 | 37.16 |
| | ν42p | 27.51 | 26.29 | 23.78 | 25.42 |
| | ν42n | 48.11 | 46.62 | 48.49 | 46.62 |
| | ν43p | 57.64 | 57.64 | 56.34 | 57.64 |
| | ν43n | 40.76 | 40.76 | 40.76 | 40.76 |
| | α42 | 0.45 | 0.59 | 0.49 | 0.64 |
| | α42' | −0.42 | −0.06 | −0.70 | −0.21 |
| | Im | 11.00 | 11.00 | 11.00 | 11.00 |
| | Z2min | −0.14 | −0.14 | −0.14 | −0.14 |
| | Z2max | −2.18 | −2.18 | −2.18 | −2.18 |
| | Magnification-varying ratio Z | 100.00 | 100.00 | 100.00 | 100.00 |
| | SK | 53.96 | 56.45 | 55.87 | 51.92 |

TABLE 2

| | Numerical Embodiment 1 | Numerical Embodiment 2 | Numerical Embodiment 3 | Numerical Embodiment 4 |
|---|---|---|---|---|
| α42 | 0.4532 | 0.5910 | 0.4940 | 0.6377 |
| α42' | −0.4170 | −0.0591 | −0.7048 | −0.2125 |
| $\bar{\alpha}_{42}$ | −0.1600 | −0.1597 | −0.1585 | −0.1583 |
| $\bar{\alpha}_{42'}$ | −0.2106 | −0.1793 | −0.2173 | −0.2002 |
| IIE | 0.0043 | 0.0060 | 0.0232 | 0.0200 |
| IIIE | 0.0070 | 0.0025 | 0.0725 | −0.0096 |
| TE | 0.0002 | 0.0002 | 0.0014 | 0.0001 |
| PE | −0.1104 | −0.0556 | −0.1913 | −0.0915 |
| VE1 | −0.0054 | 0.0061 | −0.0093 | −0.0044 |
| VE2 | −0.0239 | −0.0130 | −0.0329 | −0.0218 |
| dE | 1.7403 | 1.3002 | 2.3976 | 1.7005 |
| ΣL42 | 0.0022 | 0.0031 | −0.0027 | 0.0102 |
| ΣT42 | −0.0024 | 0.0006 | −0.0030 | −0.0013 |

TABLE 2-continued

| | Numerical Embodiment 1 | Numerical Embodiment 2 | Numerical Embodiment 3 | Numerical Embodiment 4 |
|---|---|---|---|---|
| ΣI42 | 1.2769 | −1.6196 | −0.2273 | −1.5423 |
| ΣII42 | 0.6475 | 0.8840 | 0.1947 | 1.1244 |
| ΣIII42 | −0.1332 | −0.0493 | −0.2352 | −0.0746 |
| ΣP42 | −0.0941 | −0.0637 | −0.1286 | −0.0910 |
| ΣV42 | −0.0316 | −0.0085 | −0.0399 | −0.0217 |
| ΣL43 | 0.0037 | −0.0467 | 0.0352 | 0.0068 |
| ΣT43 | 0.0000 | −0.0033 | 0.0015 | −0.0001 |
| ΣI43 | 4.8932 | 4.1044 | 4.8446 | 2.3867 |
| ΣII43 | −0.3556 | −0.3093 | 0.1227 | −0.4159 |
| ΣIII43 | −0.0800 | −0.1859 | 0.0156 | −0.1592 |
| ΣP43 | 0.1759 | 0.1435 | 0.2126 | 0.1759 |
| ΣV43 | 0.0425 | 0.0049 | 0.0561 | 0.0277 |

TABLE 3

| Glass name (trade name of OHARA INC.) | Nd | density | vd |
|---|---|---|---|
| S-LAH58 | 1.8830 | 5.52 | 40.8 |
| S-LAH55 | 1.8348 | 4.73 | 42.7 |
| S-LAH60 | 1.8340 | 4.43 | 37.2 |
| S-LAH59 | 1.8160 | 5.07 | 46.6 |
| S-LAH53 | 1.8061 | 4.43 | 40.9 |
| S-LAH63 | 1.8044 | 4.34 | 39.6 |
| S-LAH65 | 1.8040 | 4.76 | 46.6 |
| S-LAH52 | 1.7995 | 4.41 | 42.2 |
| S-LAH64 | 1.7880 | 4.30 | 47.4 |
| S-LAH51 | 1.7859 | 4.40 | 44.2 |
| S-LAH66 | 1.7725 | 4.23 | 49.3 |

FIG. 23 is a schematic diagram of a main part of an image pickup apparatus (television camera system) using the zoom lens according to each of the embodiments as an image taking optical system. In FIG. 23, a zoom lens 101 according to any one of Numerical Embodiments 1 to 4 and a camera 124 are provided. The zoom lens 101 is detachably attached to the camera 124. An image pickup apparatus 125 has a structure in which the zoom lens 101 is attached to the camera 124.

The zoom lens 101 includes a first lens unit F, a magnification-varying portion (magnification-varying lens unit) LZ and a fourth lens unit R for imaging. The first lens unit F includes a focusing lens unit. The magnification-varying portion LZ includes a second lens unit V that moves on the optical axis during magnification-varying and a third lens unit C that moves on the optical axis so as to correct image plane variation due to magnification.

The zoom lens 101 includes the aperture stop SP. The fourth lens unit R includes the first lens subunit R1, the second lens subunit R2 and the third lens subunit R3. The third lens subunit R3 includes the first lens sub-subunit R3a that is interchangeable with the built-in extender IE, and the second lens sub-subunit R3b. The extender IE is provided to shift the focal length range of the entire zoom lens 101. Drive mechanisms 114 and 115, such as helicoids or cams, drive the first lens unit F and the magnification-varying portion LZ, respectively, in the optical axis direction. Motors (drive units) 116 to 118 are provided to electrically drive the drive mechanisms 114 and 115 and the aperture stop SP.

Detectors 119 to 121, such as encoders, potentiometers or photosensors, detect the positions of the first lens unit F and the magnification-varying portion LZ on the optical axis and also detect a stop diameter of the aperture stop SP. The camera 124 includes a glass block 109 corresponding to an optical filter or a color separation prism, and a solid-state image pickup element (photoelectric transducer) 110 such as a CCD sensor or a CMOS sensor, for receiving a subject image formed by the zoom lens 101. CPUs 111 and 122 perform various drive controls of the camera 124 and the main body of the zoom lens 101, respectively. When the zoom lens according to the present invention is applied to the television camera system as described above, the image pickup apparatus having high optical performance is realized.

According to this embodiment described above, it is possible to provide the zoom lens capable of reducing the size and weight of the image stabilizing lens unit while reducing focus variation caused by the image stabilizing drive and maintaining good optical performance during image stabilizing.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Applications No. 2010-111932 filed May 14, 2010, which is hereby incorporated by reference herein in its entirety.

What is claimed is:

1. A zoom lens comprising in order from an object side to an image side:
a first lens unit having a positive refractive power that does not move for zooming;
a magnification-varying system having at least a second lens unit having a negative refractive power that moves during zooming and a third lens unit having a positive refractive power that moves during zooming; and
a fourth lens unit having a positive refractive power that does not move for zooming,
wherein the fourth lens unit includes:
a first lens subunit having a negative refractive power;
a second lens subunit having a negative refractive power that moves in a direction having a component perpendicular to an optical axis so as to displace an image in a direction perpendicular to the optical axis; and
a third lens subunit having a positive refractive power,
wherein the following conditional expression is satisfied:

$$1.2 < f41/f42 < 3.5,$$

where f41 represents a focal length of the first lens subunit, and f42 represents a focal length of the second lens subunit.

2. A zoom lens according to claim 1, wherein the second lens subunit is composed of a single positive lens and a single negative lens.

3. A zoom lens according to claim 1, wherein:
the second lens subunit is composed of two negative lenses and a single positive lens; and
the following conditional expression is satisfied:

$$3.0 \ (g/cm^3) < dave < 5.1 \ (g/cm^3),$$

where dave ($g/cm^3$) represents an average value of specific gravities of materials of the two negative lenses.

4. A zoom lens according to claim 1, wherein:
the first lens subunit is composed of a single negative lens and a single positive lens; and
the following conditional expression is satisfied:

$$10 < |vd41p - vd41n| < 25,$$

where vd41p represents an Abbe number of a material of the positive lens, and vd41n represents an Abbe number of a material of the negative lens.

5. A zoom lens according to claim 1, wherein the following conditional expressions are satisfied:

$$10 < |vd42p - vd42n| < 25; \text{ and}$$

$$10 < |vd43p - vd43n| < 25,$$

where vd42p represents an average Abbe number of materials of positive lenses among lenses constituting the second lens subunit, vd42n represents an average Abbe number of materials of negative lenses among the lenses constituting the second lens subunit, vd43p represents an average Abbe number of materials of positive lenses among lenses constituting the third lens subunit, and vd43n represents an average Abbe number of materials of negative lenses among the lenses constituting the third lens subunit.

6. A zoom lens according to claim 1, wherein:
during zooming from a wide-angle side to a telephoto side, the second lens unit moves along the optical axis from the object side to the image side, whereas the third lens unit moves along the optical axis from the image side to the object side and passes through a zoom position having an imaging magnification of −1 during the movement; and the following conditional expressions are satisfied:

$$10 < Z2max/Z2min; \text{ and}$$

$$0.13 < Z2max/(Z2min \times Z),$$

where Z2max and Z2min represent a maximum value and a minimum value of lateral magnification of the second lens unit, respectively, and Z represents a zoom ratio of the zoom lens.

7. A zoom lens according to claim 1, wherein the following conditional expression is satisfied:

$$0.5 < |\beta 21| < 15,$$

where β42 represents imaging magnification of the second lens subunit.

8. An image pickup apparatus comprising:
a zoom lens; and
an image pickup element which receives an image formed by the zoom lens,
wherein the zoom lens comprises in order from an object side to an image side:
a first lens unit having a positive refractive power that does not move for zooming;
a magnification-varying system having at least a second lens unit having a negative refractive power that moves during zooming and a third lens unit having a positive refractive power that moves during zooming; and
a fourth lens unit having a positive refractive power that does not move for zooming,
wherein the fourth lens unit includes:
a first lens subunit having a negative refractive power;
a second lens subunit having a negative refractive power that moves in a direction having a component perpendicular to an optical axis so as to displace an image in a direction perpendicular to the optical axis; and
a third lens subunit having a positive refractive power,
wherein the following conditional expression is satisfied:

$$1.2 < f41/f42 < 3.5,$$

where f41 represents a focal length of the first lens subunit, and f42 represents a focal length of the second lens subunit.

9. An image pickup apparatus according to claim 8, wherein:
the following conditional expression is satisfied:

$$3 < SK/Im < 6,$$

where SK represents an equivalent length in air of a distance between an image plane and a lens surface which is disposed on the most image plane side among lenses constituting the fourth lens unit, and Im represents an image size of the image pickup element.

10. An image pickup apparatus according to claim 8, wherein:
the following conditional expression is satisfied:

$$0.04 \text{ (rad/mm)} < |\alpha'IS - \alpha IS|/Im < 0.14 \text{ (rad/mm)},$$

where αIS (rad) represents an incident conversion angle of inclination of a beam to a lens surface which is disposed on the most object side among lenses constituting the second lens subunit, α'IS (rad) represents an exit converted inclination angle of a beam from a lens surface which is disposed on the most image side among the lenses constituting the second lens subunit, and Im represents an image circle of the image pickup element.

* * * * *